(12) United States Patent
Hashimoto

(10) Patent No.: US 8,718,069 B2
(45) Date of Patent: May 6, 2014

(54) TRANSMISSION APPARATUS AND SIGNAL TRANSMISSION METHOD FOR MAPPING PACKETS IN FRAMES OF SYNCHRONOUS NETWORK

(75) Inventor: Haruhiko Hashimoto, Osaka (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 12/877,726

(22) Filed: Sep. 8, 2010

(65) Prior Publication Data

US 2011/0058555 A1 Mar. 10, 2011

(30) Foreign Application Priority Data

Sep. 9, 2009 (JP) ................................ 2009-207819

(51) Int. Cl.
*H04L 12/28* (2006.01)
(52) U.S. Cl.
USPC .................................................. 370/395.51
(58) Field of Classification Search
None
See application file for complete search history.

(56) References Cited

U.S. PATENT DOCUMENTS

| | | | | | |
|---|---|---|---|---|---|
| 4,597,073 | A | * | 6/1986 | Staples | 370/276 |
| 5,657,241 | A | * | 8/1997 | Butts et al. | 716/103 |
| 5,699,369 | A | * | 12/1997 | Guha | 714/774 |
| 5,886,989 | A | * | 3/1999 | Evans et al. | 370/347 |
| 6,115,775 | A | * | 9/2000 | Ross et al. | 710/260 |
| 6,498,794 | B1 | | 12/2002 | Tsukamoto et al. | |
| 6,519,261 | B1 | * | 2/2003 | Brueckheimer et al. | 370/395.52 |
| 6,574,224 | B1 | * | 6/2003 | Brueckheimer et al. | 370/395.6 |
| 6,917,614 | B1 | * | 7/2005 | Laubach et al. | 370/392 |
| 6,963,751 | B1 | * | 11/2005 | Kordsmeyer et al. | 455/466 |
| 7,020,158 | B2 | * | 3/2006 | Rouaud | 370/465 |
| 7,050,399 | B2 | * | 5/2006 | Masuda | 370/245 |
| 7,447,214 | B2 | * | 11/2008 | Green | 370/395.51 |
| 7,583,664 | B2 | * | 9/2009 | Ho et al. | 370/386 |
| 7,724,781 | B1 | * | 5/2010 | Wu et al. | 370/510 |
| 7,782,805 | B1 | * | 8/2010 | Belhadj et al. | 370/300 |
| 8,139,609 | B2 | * | 3/2012 | Pani et al. | 370/474 |
| 8,189,463 | B2 | * | 5/2012 | Du et al. | 370/229 |
| 8,189,599 | B2 | * | 5/2012 | Sharma et al. | 370/395.5 |
| 8,265,063 | B2 | * | 9/2012 | Izumi | 370/352 |
| 2002/0064181 | A1 | * | 5/2002 | Ofek et al. | 370/477 |
| 2002/0110157 | A1 | * | 8/2002 | Jorgenson et al. | 370/537 |
| 2002/0141397 | A1 | * | 10/2002 | Piekarski et al. | 370/360 |
| 2002/0176450 | A1 | * | 11/2002 | Kong et al. | 370/539 |

(Continued)

FOREIGN PATENT DOCUMENTS

| | | |
|---|---|---|
| JP | 2000-174758 A | 6/2000 |
| JP | 2003-69519 A | 3/2003 |
| JP | 2005-223882 A | 8/2005 |
| JP | 2006-80775 A | 3/2006 |

OTHER PUBLICATIONS

Japanese Office Action mailed Aug. 6, 2013 for corresponding Japanese Application No. 2009-207819, with Partial English-language Translation.

*Primary Examiner* — Phirin Sam
*Assistant Examiner* — Faiyazkhan Ghafoerkhan
(74) *Attorney, Agent, or Firm* — Fujitsu Patent Center

(57) ABSTRACT

A transmission apparatus that receives plural packets and transmits a frame of a synchronous network, includes a multiplexing part that divides, in segment units, the plural packets, each segment having a predetermined length, and multiplexes the segments to generate a data stream signal; a transmitting part that transmits the data stream signal to a mapping part; and the mapping part that maps the data stream signal in the frame of the synchronous network.

18 Claims, 20 Drawing Sheets

(56) References Cited

U.S. PATENT DOCUMENTS

| | | | |
|---|---|---|---|
| 2002/0196784 A1* | 12/2002 | Masuda ........................ 370/355 |
| 2003/0043838 A1 | 3/2003 | Shimada et al. |
| 2003/0189925 A1* | 10/2003 | Wellbaum et al. ............ 370/372 |
| 2003/0210909 A1* | 11/2003 | Rowan et al. .................... 398/43 |
| 2004/0073717 A1* | 4/2004 | Cline et al. .................... 709/250 |
| 2004/0146058 A1* | 7/2004 | Nemoto et al. ............... 370/401 |
| 2004/0156313 A1* | 8/2004 | Hofmeister et al. .......... 370/229 |
| 2004/0208120 A1* | 10/2004 | Shenoi .......................... 370/229 |
| 2005/0008042 A1* | 1/2005 | Rouaud ......................... 370/539 |
| 2005/0039101 A1* | 2/2005 | Torsner ......................... 714/748 |
| 2005/0047419 A1* | 3/2005 | Green ...................... 370/395.51 |
| 2005/0220148 A1* | 10/2005 | DelRegno et al. ............ 370/498 |
| 2005/0245276 A1* | 11/2005 | Torsner ......................... 455/502 |
| 2005/0276223 A1* | 12/2005 | Maggi et al. .................. 370/235 |
| 2006/0039374 A1* | 2/2006 | Belz et al. ..................... 370/389 |
| 2006/0140226 A1* | 6/2006 | Ho et al. ....................... 370/539 |
| 2006/0153179 A1* | 7/2006 | Ho et al. ....................... 370/386 |
| 2006/0277346 A1* | 12/2006 | Doak et al. .................... 710/305 |
| 2007/0047592 A1* | 3/2007 | Jorgenson et al. ............ 370/509 |
| 2007/0047594 A1* | 3/2007 | Malik et al. ................... 370/907 |
| 2007/0067481 A1* | 3/2007 | Sharma et al. ................ 709/231 |
| 2007/0223496 A1* | 9/2007 | Izumi ............................ 370/397 |
| 2007/0242676 A1* | 10/2007 | Fridman .................... 370/395.5 |
| 2009/0175214 A1* | 7/2009 | Sfar et al. ...................... 370/315 |
| 2009/0279435 A1* | 11/2009 | Du et al. ........................ 370/235 |
| 2011/0058555 A1* | 3/2011 | Hashimoto ................... 370/392 |

* cited by examiner

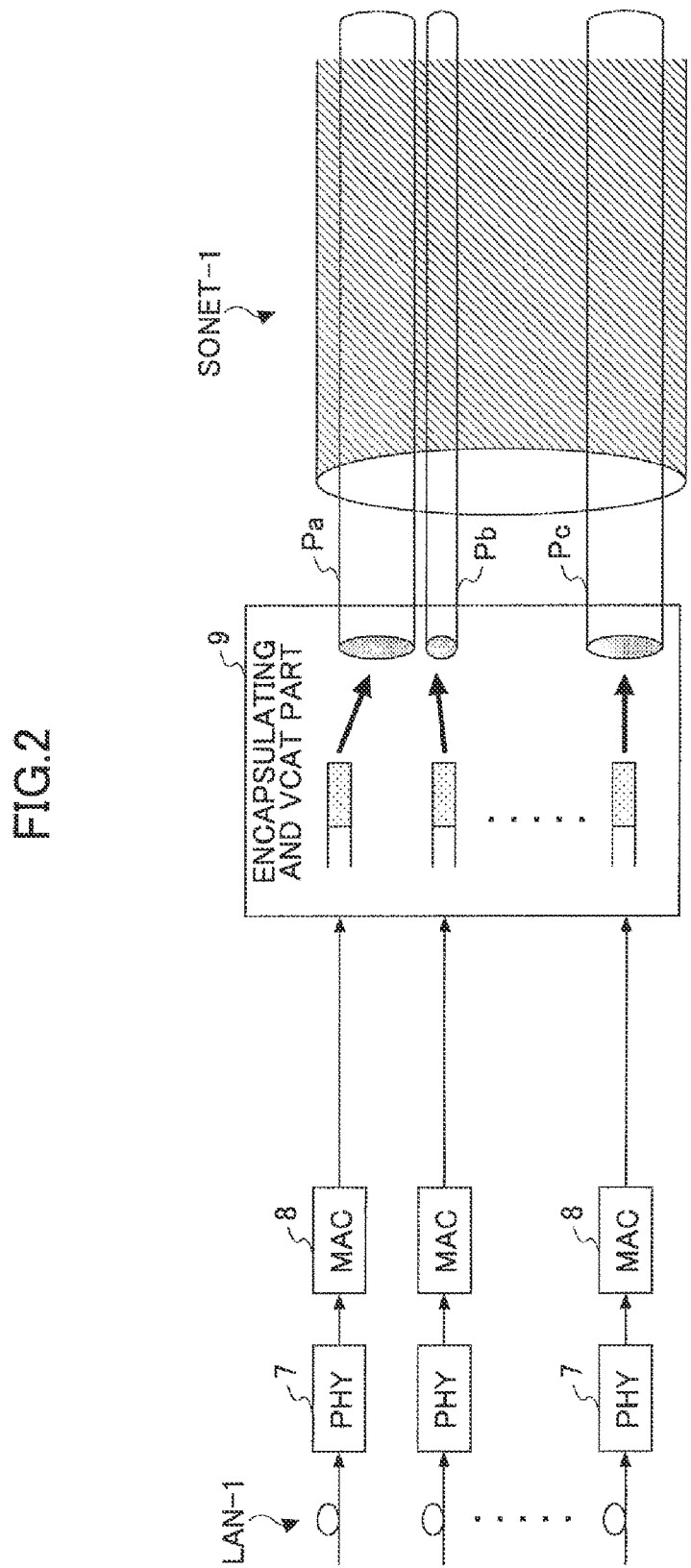

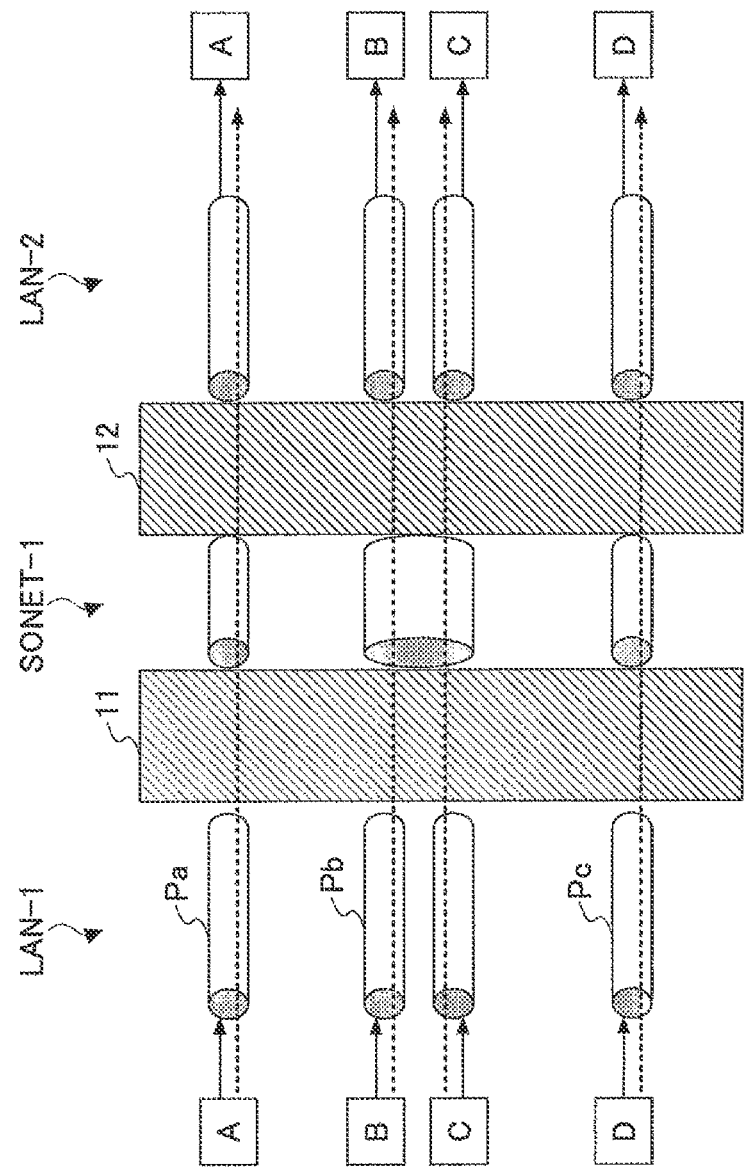

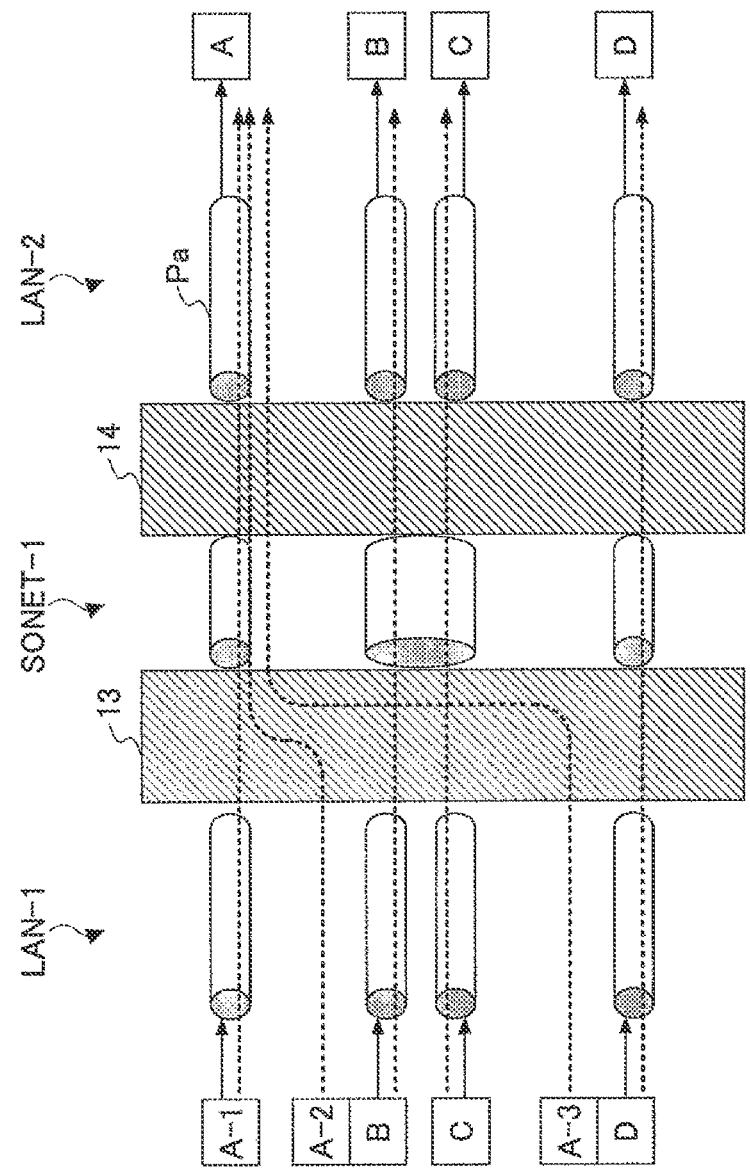

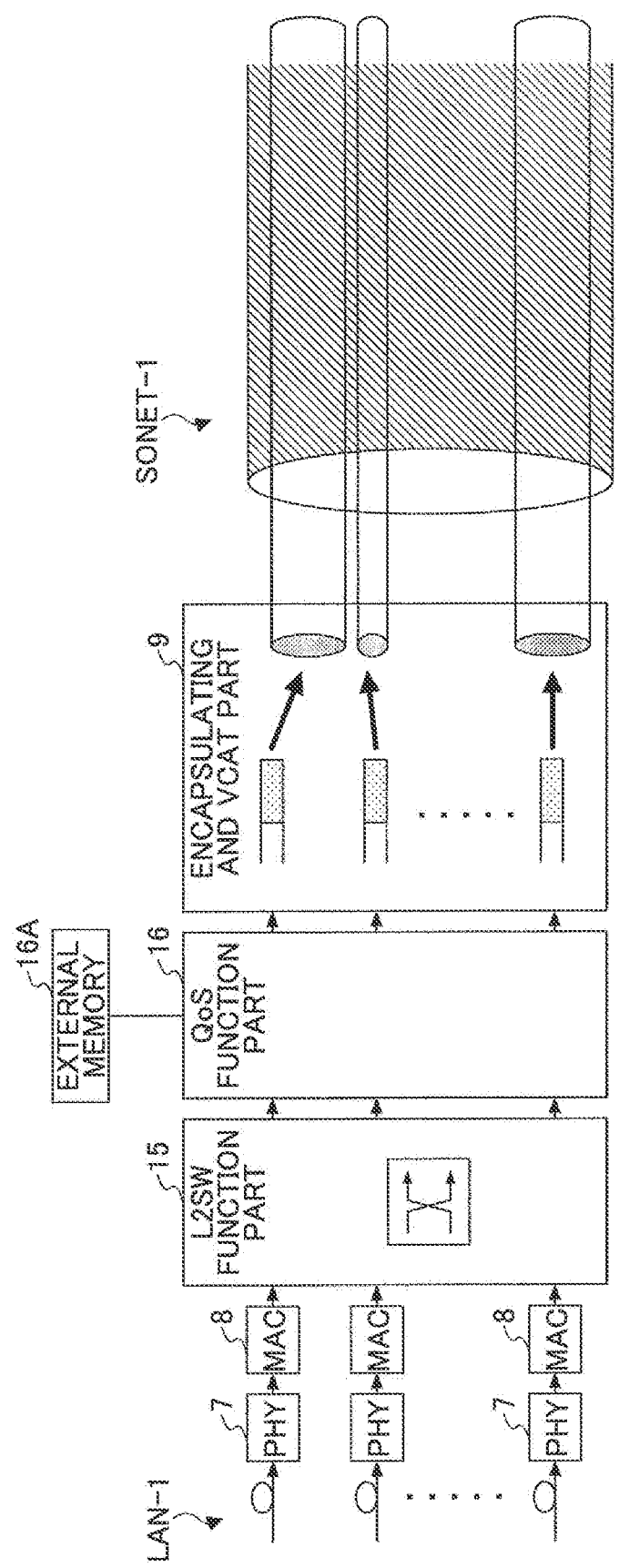

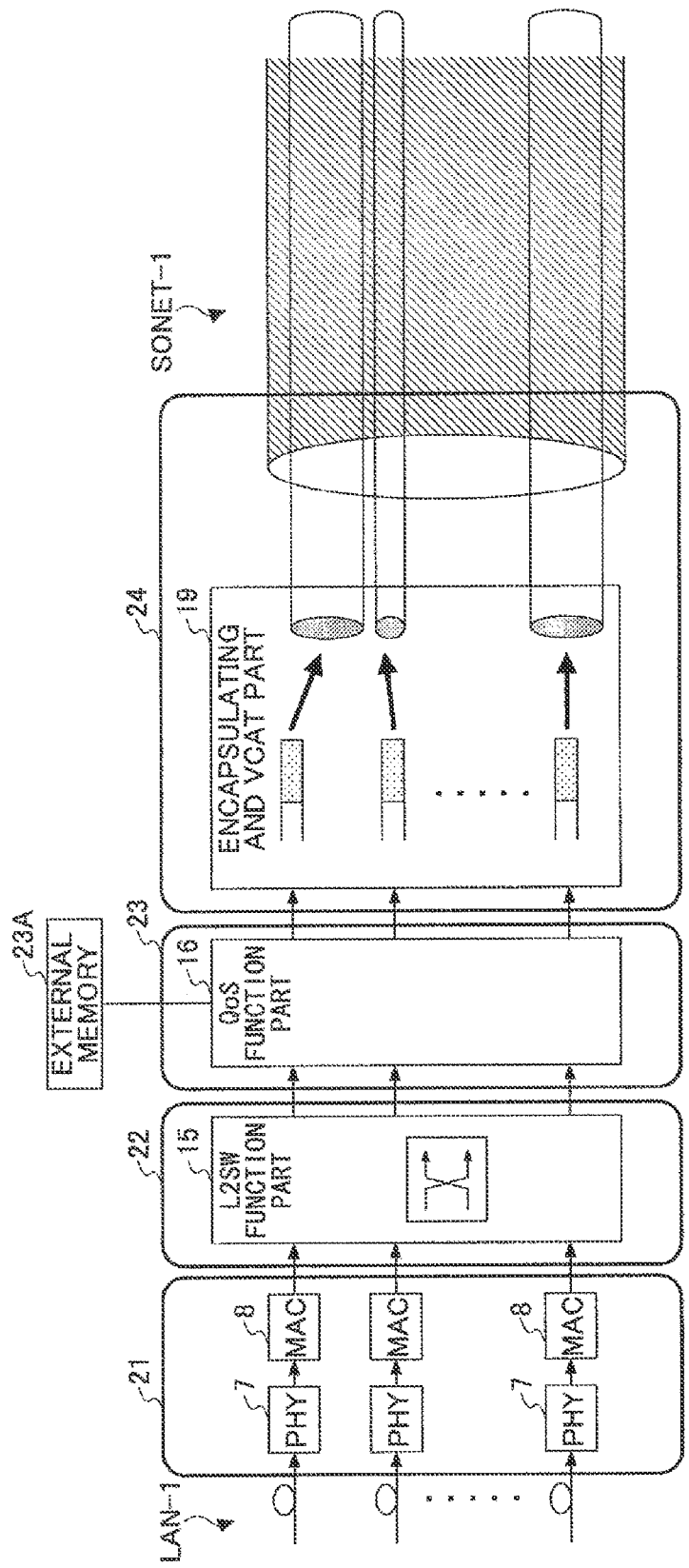

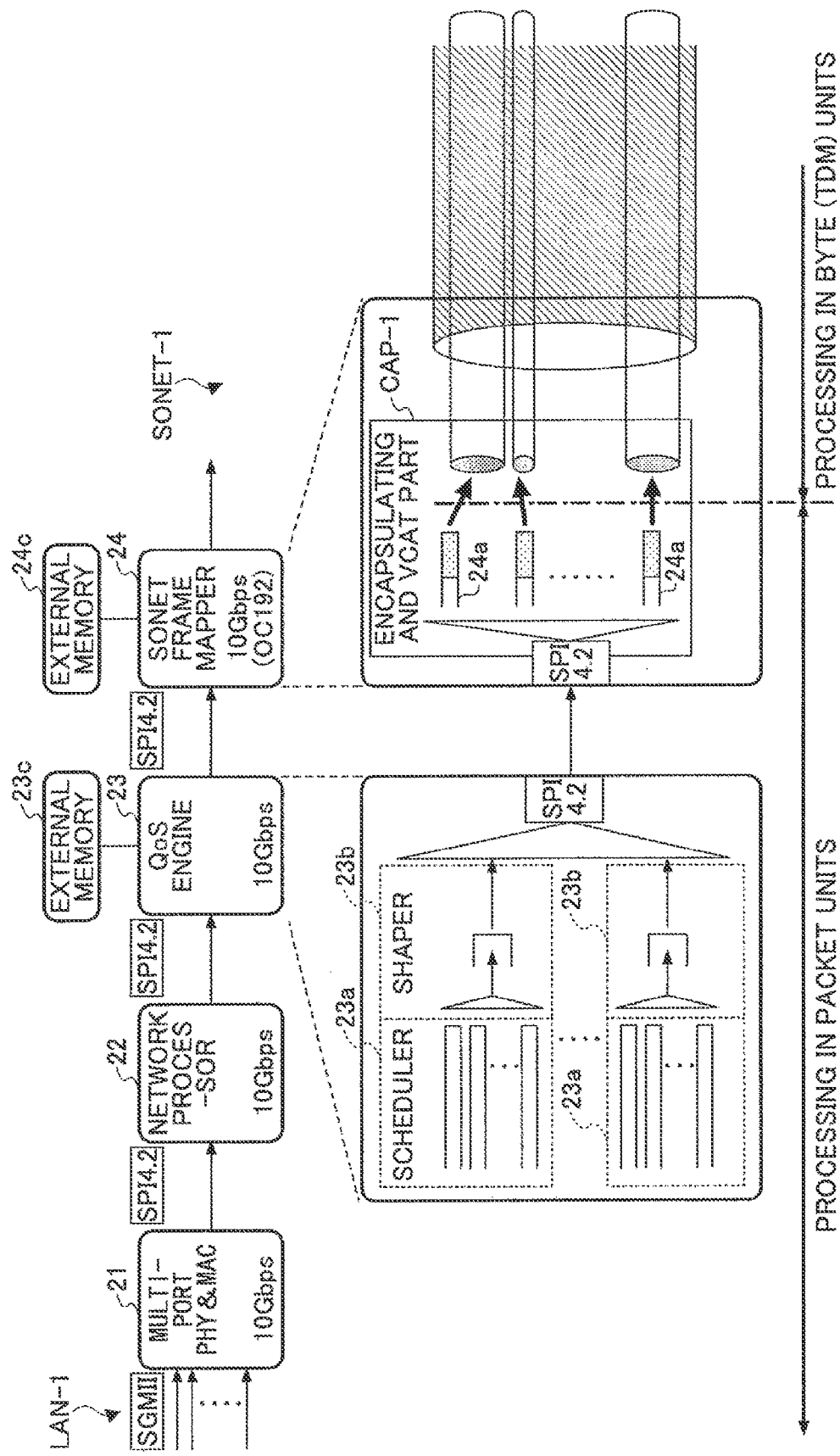

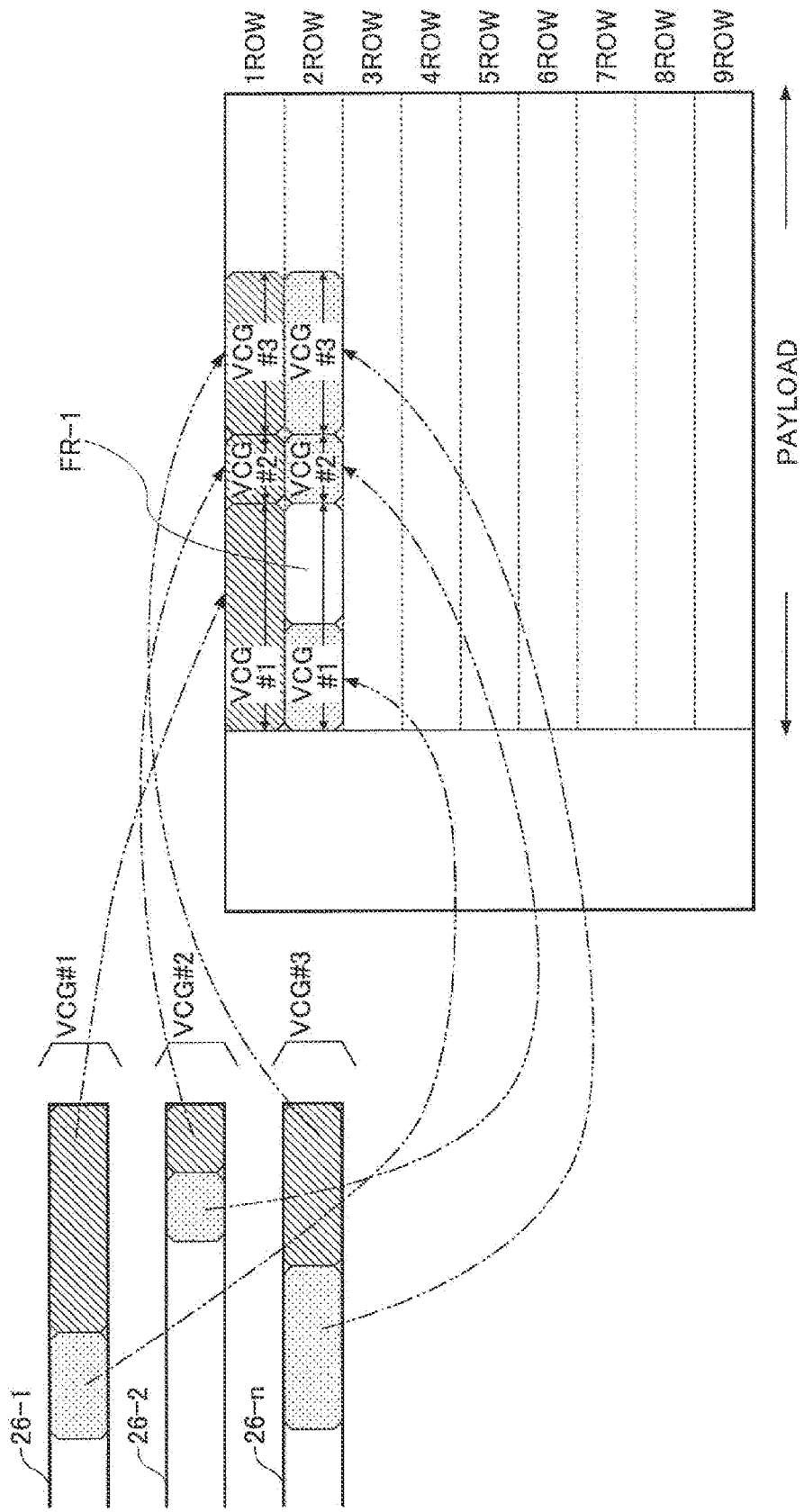

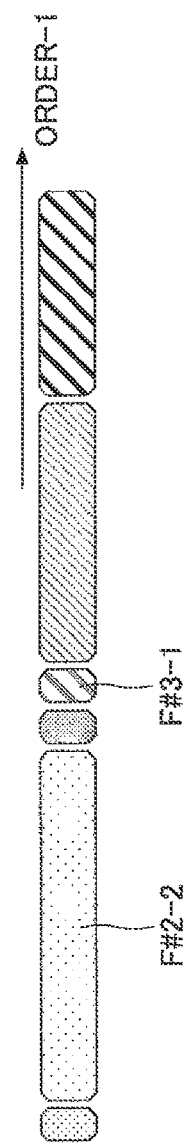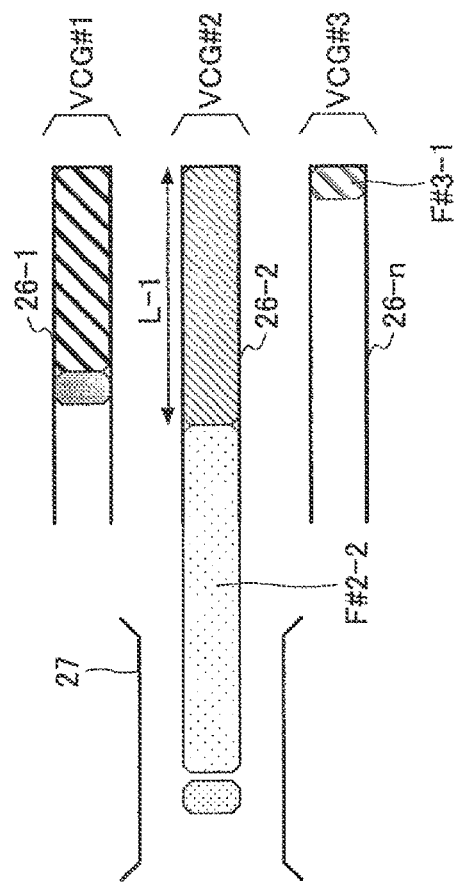
FIG.8A
FIG.8B

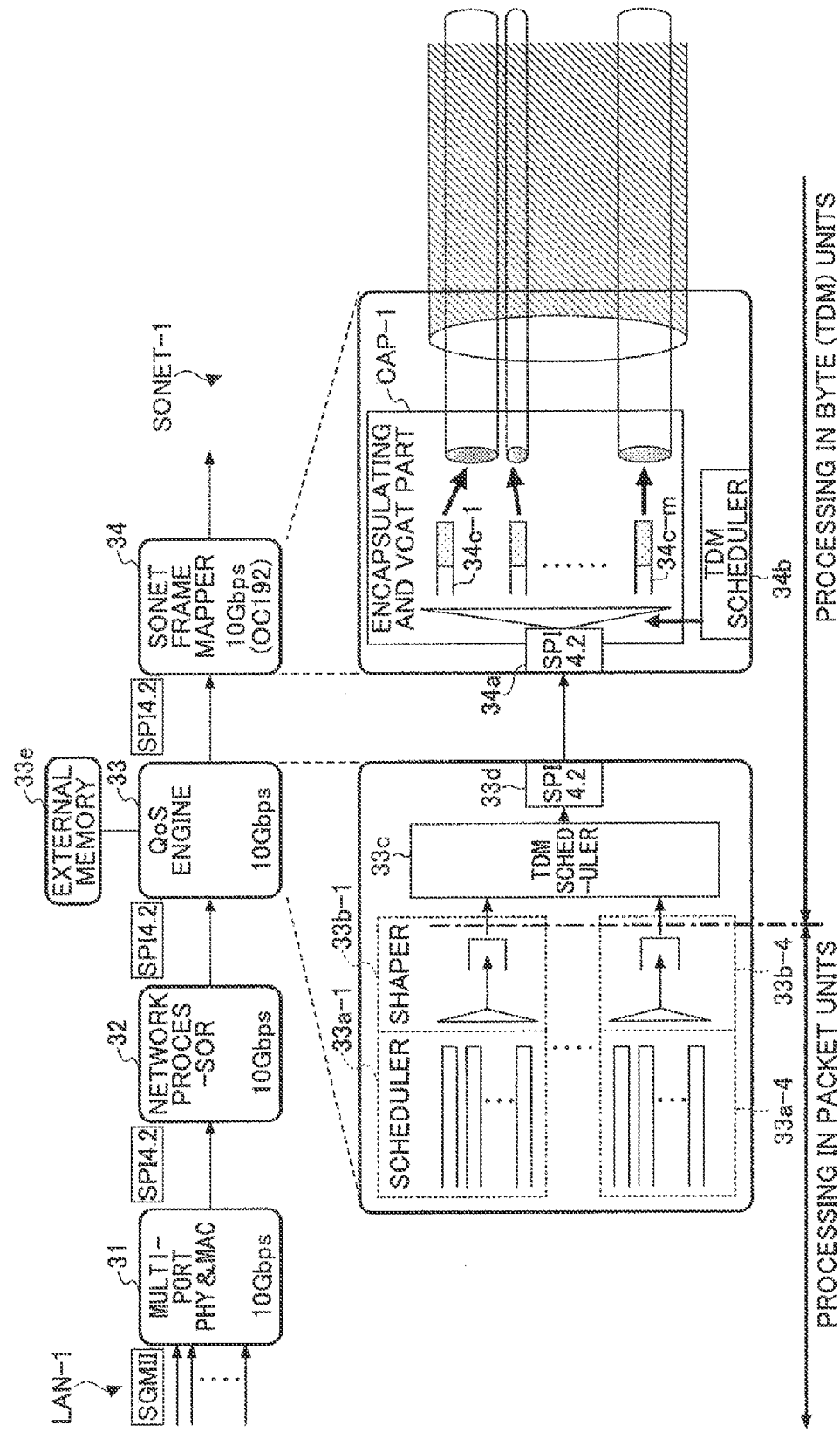

FIG.13

BIT POSITION

| 15 | TYPE |
| 14 | EOPS |
| 13 | |
| 12 | SOP |
| 11 | |
| 10 | |
| 09 | |
| 08 | ADR |
| 07 | |
| 06 | |
| 05 | |
| 04 | |
| 03 | |
| 02 | DIP4 |
| 01 | |
| 00 | |

FIG.18

| TIME SLOT NO. | STS NO. |
|---|---|
| 1 | 48#1 VCG ch1 |
| 2 | 48#2 ch1 |
| 3 | 48#3 ch1 |
| 4 | 48#4 ch1 |
| 5 | 48#1 VCG ch1 |
| 6 | 48#2 ch4 |
| 7 | 48#3 ch4 |
| 8 | 48#4 ch4 |
| 9 | 48#1 VCG ch1 |
| 10 | 48#2 ch7 |
| ⋮ | ⋮ |
| 192 | STS 48#3 ch48 |

TB1

TRANSMISSION APPARATUS AND SIGNAL TRANSMISSION METHOD FOR MAPPING PACKETS IN FRAMES OF SYNCHRONOUS NETWORK

CROSS-REFERENCE TO RELATED APPLICATIONS

This application is based upon and claims the benefit of priority of Japanese Patent Application No. 2009-207819, filed on Sep. 9, 2009, the entire contents of which are incorporated herein by reference.

FIELD

The embodiment discussed herein is directed to a transmission apparatus and a signal transmission method, in which packets are mapped in a frame of a synchronous network, and the frame is sent to the synchronous network.

BACKGROUND

Japanese Laid-Open Patent Application No. 2005-223882 discusses a data processing method and a data processing apparatus in which a coded digital signal such as a 10 Gigabit Ethernet (registered trademark) is fractionalized in sub-channels having variable granularity, and the sub-channels are mapped in tributaries of a SONET (Synchronous Optical Network)/SDH (Synchronous Digital Hierarchy) path, through a sequential process, i.e., in a cut-through manner not in a store-and-forward manner.

SUMMARY

In the embodiment, a transmission apparatus that receives plural packets and transmits frames of a synchronous network, includes a multiplexing part that divides the plural packets into segments, each segment having a predetermined length, and multiplexes the segments to generate a data stream signal; a transmitting part that transmits the data stream signal to a mapping part; and the mapping part that maps the data stream signal in the frame of the synchronous network.

It is to be understood that both the foregoing general description and the following detailed description are exemplary and explanatory only and are not restrictive of the invention, as claimed.

BRIEF DESCRIPTION OF DRAWINGS

FIG. 2 illustrates internal process blocks of an EOS apparatus;

FIGS. 3A, 3B and 4 illustrate process blocks of an EOS apparatus;

FIG. 5 depicts a device separation of an EOS apparatus;

FIG. 6 depicts a configuration of a QoS engine;

FIG. 7 depicts frame mapping in SONET;

FIGS. 8A, 8B and FIGS. 9A, 9B illustrate an increase in a buffer size;

FIG. 10 depicts a configuration of one embodiment of an EOS apparatus;

FIG. 13 depicts a format of a control word;

FIG. 18 depicts a first example of a bandwidth setting table; and

DESCRIPTION OF EMBODIMENTS

First, an EOS system will be described. In the EOS system, packets of a LAN (Local Area Network) such as Ethernet are mapped in a frame of a synchronous network such as SONET or SDH, and the frame is transmitted through the synchronous network.

Figure 1:
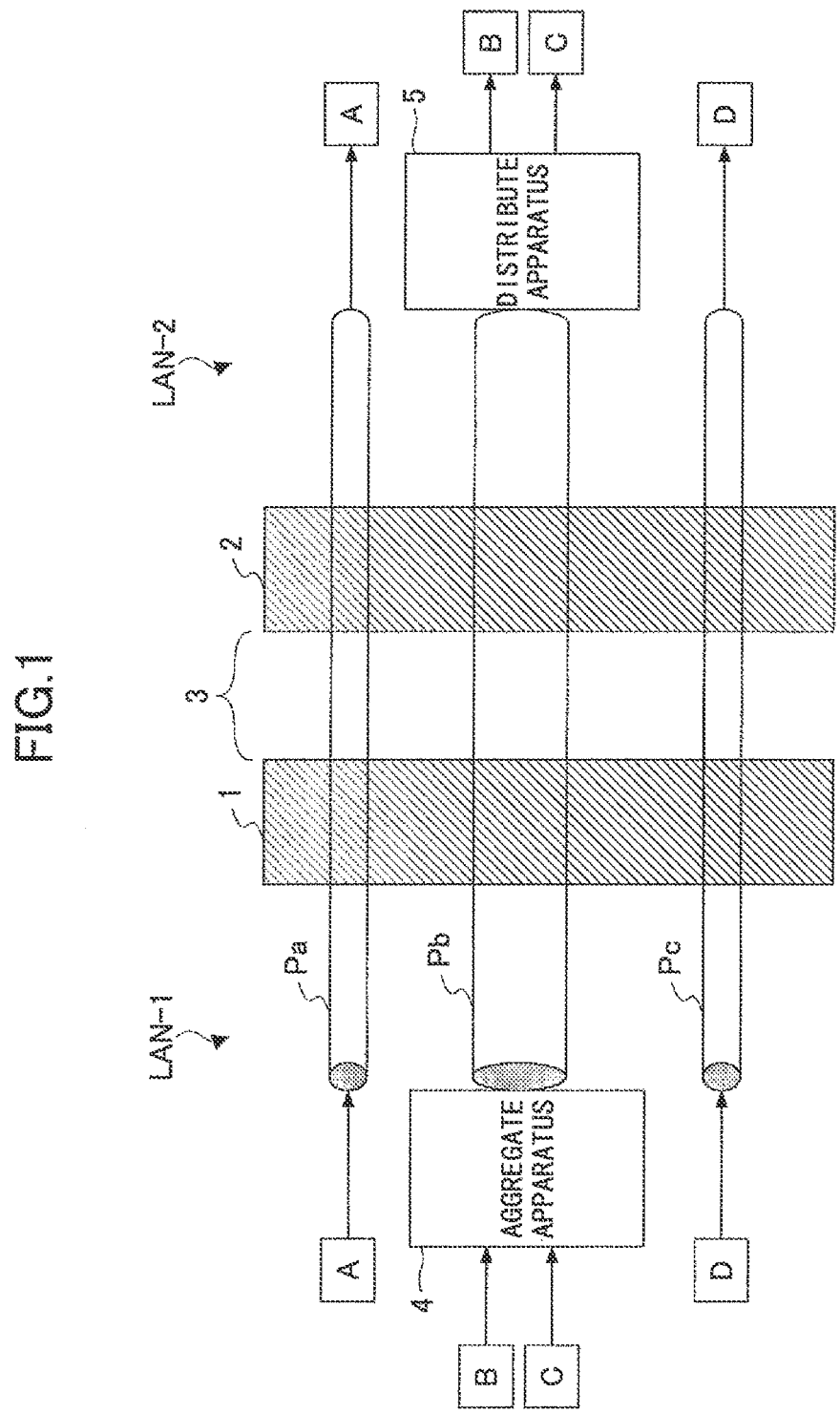
FIG. 1 depicts a configuration of one example of an EOS (Ethernet Over SONET/SDH) system.

FIG. 1 depicts one example of the EOS system. In FIG. 1, EOS apparatuses 1 and 2 are connected by a SONET (or SDH) 3 that is a synchronous network. A path Pa is created to connect between a user A connected via a LAN (LAN-1) and a user A who exists at a remote point (via a LAN (LAN-2)), in a peer to peer manner, via the SONET 3. Similarly, A path Pc is created to connect between a user D connected via a LAN (LAN-1) and a user D who exists at a remote point (via a LAN (LAN-2)), in a peer to peer manner, via the SONET 3. The LAN (LAN-1 and LAN-2) may be in according to SGMII (Serial Gigabit Media Independent Interface).

Further, LAN packets of plural users B and C are aggregated by using identifiers such as VLAN-ID by means of an aggregate apparatus 4, and a path Pb is created as an EOS path to connect both ends in a peer to peer manner. Then, the LAN packets are distributed in appropriate lines by using information such as VLAN-ID for identification by means of a distribute apparatus 5.

As internal process blocks of the above-mentioned EOS apparatuses 1 and 2, as depicted in FIG. 2, termination of the LAN (LAN-1) is carried out by PHY (physical layer processing parts) 7 and MAC (media access control layer processing parts) 8. As SONET paths in SONET (SONET-1), any bandwidths are reserved by an encapsulating and VCAT (virtual concatenation) part 9. In the reserved bandwidths, the paths Pa, Pb and Pc are created. The EOS system is realized as a result of 1:1 mapping of the LAN channels in VCAT channels of SONET being carried out. This is a case where the simple 1:1 peer to peer EOS system is realized in which a bandwidth that is set by using vertical concatenation of SONET is used as the upper bandwidth limit.

Further, as a customer's request, a demand arises that, as depicted in FIG. 3A (including LAN (LAN-1), SONET (SONET-1) and LAN (LAN-2)), aggregate apparatuses and distribute apparatuses are functionally included in EOS apparatuses 11 and 12, respectively, and thus, cost reduction is achieved. Further, a demand arises that, as depicted in FIG. 3B (also including LAN (LAN-1), SONET (SONET-1) and LAN (LAN-2)), a unit of a district is allocated a single LAN physical line by EOS apparatuses 13 and 14, and plural users are accommodated in the single LAN physical line. In FIG. 3B, plural users A-1, A-2 and A-3 are allocated a LAN physical line Pa.

The system of FIG. 2 cannot manage, as a single domain, plural users on the side of the LAN (LAN-1). For this purpose, as depicted in FIG. 4, a L2SW (layer 2 switch) function part 15 and a QoS (Quality of Service) function part 16 (with an external memory 16A) are provided between the MAC 8 and the encapsulating and VCAT part 9 that acts as a SONET frame mapper.

The L2SW function part 15 provides such a function that switching of packets that are input from plural ports of the LAN (LAN-1) are carried out, in packet units, and are accommodated in destination VCAT paths. As a result of providing the L2SW function part 15, traffic concentration of N:1 (single output from plural inputs) may occur. Therefore, the QoS function part 16 considers priority of the packets, and forwards packets having higher priority earlier. In a case where a buffer (not depicted) overflows, packets having lower priority are discarded (tail drop).

FIG. 5 depicts a block diagram in which these functional blocks are mapped in respective devices so that the functional blocks are realized as the actual devices. In FIG. 5, a multi-port PHY & MAC 21 carries out the physical layer processing and the MAC layer processing. A network processor 22 carries out the L2SW function. A QoS engine 23 and an external memory 23c carry out the QoS function. Further, a SONET frame mapper 24 maps LAN channels in VCAT channels of SONET.

Generally speaking, the QoS engine 23 and the SONET frame mapper 24 are mapped in separate devices. This is because the QoS engine 23 may be used as an interface for inputting packets and outputting packets and processing LAN packets or IP packets, and be generally used also for other than EOS, i.e., as a commonly used L2SW or such. In contrast, the SONET frame mapper 24 realizes the EOS, inputs LAN packets and outputs a SONET frame. Therefore, ordinarily, the QoS engine 23 and the SONET frame mapper 24 are provided in separate devices as main functions and dividing the functions.

As interfaces between the respective devices, an OC (Optical Carrier)-192 bandwidth of SONET is assumed, and SPI4.2 (System Packet Interface level 4, Phase 2) that is a standard interface standard and a de facto standard is adopted. SPI4.2 has a specification standardized by the Optical Internetworking Forum, and is an OC-192 system interface for physical and link layer devices.

FIG. 6 depicts a configuration of the QoS engine 23. In FIG. 6, the QoS engine 23 includes priority schedulers 23a that store frames and earlier output those having higher priority, and shapers (output shapers) 24a that process frames to match them to an output bandwidth. The external memory 23c provides queues that store frames when the priority process is carried out.

SPI4.2 is standardized assuming transmission in packet units. Accordingly, when a function of SPI4.2 is used, as depicted to the bottom of FIG. 6, processing in packet units is carried out, up to buffers 24a that the SONET frame mapper 24 has. After that, the SONET frame mapper 24 carries out a TDM (time division multiplexing) process in byte units. In this case, sizes of the buffers 24a that the SONET frame mapper 24 has may be increased. It is noted that the increase in the sizes of the buffers 24a is not caused by adopting SPI4.2.

<Increase in Buffer Sizes>

As depicted in FIG. 7, frame mapping in a payload (1 through 9 rows) of SONET is carried out in such a manner that packets are read from buffers 26-1 through 26-n (corresponding to the buffers 24a in FIG. 6) provided for every VCAT path, in byte units, every STS (Synchronous Transport Signal) channel, in a manner of TDM of SONET, and the read packets are mapped. In FIG. 7, VCG (Virtual Concatenate Group) #1 is in a state in which many STS channels are concatenated, and thus, reading is carried out frequently from a buffer 26-1 of the VCG#1. On the other hand, a buffer 26-2 of VCG#2 is in a state in which bandwidth allocation is small, and thus, reading is carried out, not as frequently, from the buffer 26-2 of VCG#2. It is noted that FR-1 in FIG. 7 means that a GFP (Generic Framing Procedure) idle frame FR-1 is inserted because no data exists to insert.

In this case, as a difference in packet length between the shortest and the longest packets is larger, the buffer sizes increase. SPI4.2 that is a transmission path is such that transmission is carried out, packet by packet, while SPI4.2 supports up to 10 Gpbs in bandwidth. Therefore, the transmission path of SPI4.2 is like a bridge through which only one packet can pass at a time, and thus, the length of a packet is the point aimed at.

As depicted in FIG. 8A, packets having various frame lengths are transferred from the QoS engine 23 to the buffers 26-1 through 26-n that are provided for respective destinations in the SONET frame mapper 24 via the SPI4.2 transmission path 27. Assuming that the output bandwidths are uniform, each of the buffers 26-1 through 26-n has a size L-1 such as to store the single longest packet. Further, the buffer 26-2 overflows while the frame F#2-2 of the second packet of VCG#2 shown in FIG. 8B is transferred. Therefore, packet transfer operation is temporarily stopped because flow control functions. It is noted that, in FIG. 8A, an arrow ORDER-1 denotes an order in which the frames are forwarded.

Then, the first frame F#3-1 of VCG#3 of FIG. 8B is read from the buffer 26-n by the TDM manner of SONET. After that, the buffer 26-n has no packet. However, although the QoS engine 23 that is a transmission source has frames that are to be forwarded, the QoS engine 23 cannot output the frames because the transfer operation is temporarily stopped during transfer of the second frame F#2-2 of VCG#2 because the flow control functions as mentioned above. Such a situation is called "head of line blocking". In order to avoid head of line blocking, the buffer sizes are preferably increased more as the difference in packet length between the shortest and the longest packets increases, and thus, the buffer sizes increase.

Further, as the number of VCAT that are provided for respective destinations increases, the buffer sizes increase. This is because as the number n of VCATs that are provided for respective destinations increases, the number of the buffers 26-1 through 26-n increases accordingly. Therefore, assuming that the sizes of the buffers are approximately uniform, the buffer size that is the total of all the buffer sizes increases.

Figure 9A:
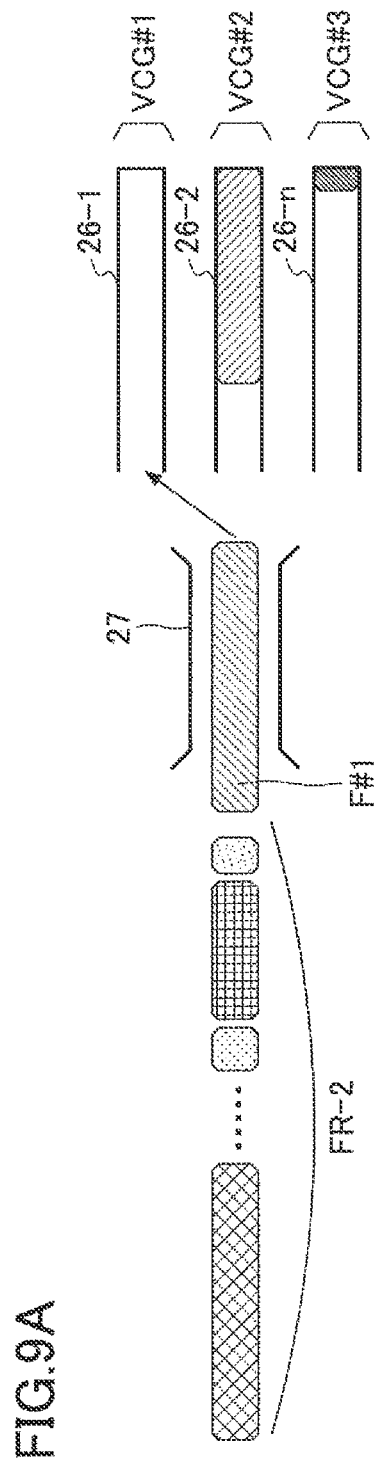
Figure 9B:
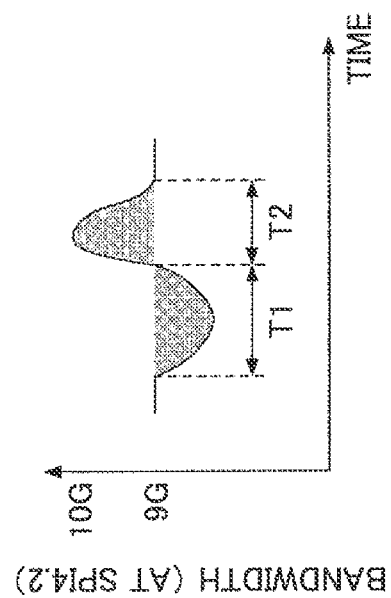

Further, as a difference between the lowest bandwidth and the highest bandwidth increases, the buffer sizes increase. According to SPI4.2, a next frame cannot be transmitted until transmission of a current frame is completed. FIG. 9A depicts a state in which a long frame F#1 having a destination of VCG#1 is transmitted by the SPI4.2 transmission path 27. FIG. 9B expresses a bandwidth change model in the SPI4.2 transmission path 27 paying attention to the bandwidth of VCG#3. During a time T1 in which the packet is transmitted to the other destination, for example, VCG#1, the bandwidth for VCG#3 temporarily lowers. In a subsequent time T2, frames FR-2 for VCG#3 are successively transmitted in a burst manner so as to recover the lowering in the bandwidth. Accordingly, the buffer for VCG#3 preferably has such a size to cope with the transmission in the burst manner. It is noted that, in FIG. 9A, it is assumed that the bandwidth of VCG#2 is 50 Mbps, and the bandwidth of VCG#3 is 9000 Mbps, for example.

In a case where bandwidth allocations to of the respective VCGs are uniform, the buffer sizes may be uniform. However, in a case where the frame length for VCG#1 is the maximum as depicted in FIG. 9A, most time is consumed. As the consumed time increases, the bandwidth for VCG#3 lowers more in comparison to the bandwidth that is originally set for VCG#3, and the bandwidth recovery operation occurs. As the bandwidth that is originally set is wide, the frequency of the bandwidth recovery operations increases.

It is noted that the total of the VCG bandwidths is the SONET bandwidth. Therefore, a case where the respective VCG bandwidths are not uniform, and also, the maximum bandwidth is large, can be expressed as a case where the difference between the lowest bandwidth and the highest bandwidth increases. That is, when the difference between the lowest bandwidth and the highest bandwidth increases, the buffer sizes increase.

When the buffer sizes of the buffers included in the SONET frame mapper 24 thus increase, it may be difficult to include the buffers in the inside of the device of the SONET frame mapper 24, and, as depicted in FIG. 6, the external memory 24c may be provided. Even in a case where a shared buffer management system is used to reduce the total of the buffer sizes, a circuit that manages the system may be complicated and have an increased size.

The embodiment can reduce the buffer sizes.

The embodiment will now be described with reference to figures.

<EOS Apparatus in Embodiment>

FIG. 10 depicts a configuration of an EOS apparatus in the embodiment as a transmission apparatus. In FIG. 1, a multiport PHY & MAC 31 carries out a physical layer process and a MAC layer process on a received packet. A network processor 32 carries out a L2SW process on the received packet. It is noted that, although the above-mentioned packet is actually a frame of the packet, the frame may be referred to as a packet here for the purpose of distinguishing from a frame of SONET). A QoS engine 33 carries out a QoS process.

The QoS engine 33 includes priority schedulers 33a-1 through 33a-4 that store the packets and output the packets in such a manner that a packet having higher priority is output earlier; shapers 33b-1 through 33b-4 that process the packets to match output bandwidths; a TDM scheduler 33c that multiplexes respective outputs of the shapers 33b-1 through 33b-4; and a SPI4.2 interface 33d. An external memory 33e provides queues that store the frames for the purpose of carrying out the priority process.

The SONET frame mapper 34 includes a SPI4.2 interface 34a; a TDM scheduler 34b that carries out multiplexing and demultiplexing; and queues 34c-1 through 34c-m that store segments in destination units. The SONET frame mapper 34 includes an encapsulating and VCAT part CAP-1 that maps LAN channels, which are reorganized in the queues 34c-1 through 34c-m, in VCG channels of SONET. The "segments" will be described later.

Transmission according to SPI4.2 assumes transmission in packet units. However, the minimum packet is assumed. Therefore, the length of the minimum packet is regarded as a fixed length unit. Specifically, a burst length (BL) is set to have a size of 16 bytes (minimum packet). A slot number is defined in burst units of 16 bytes of SPI4.2, and the slot number is allocated to a SONET channel.

Figure 11:
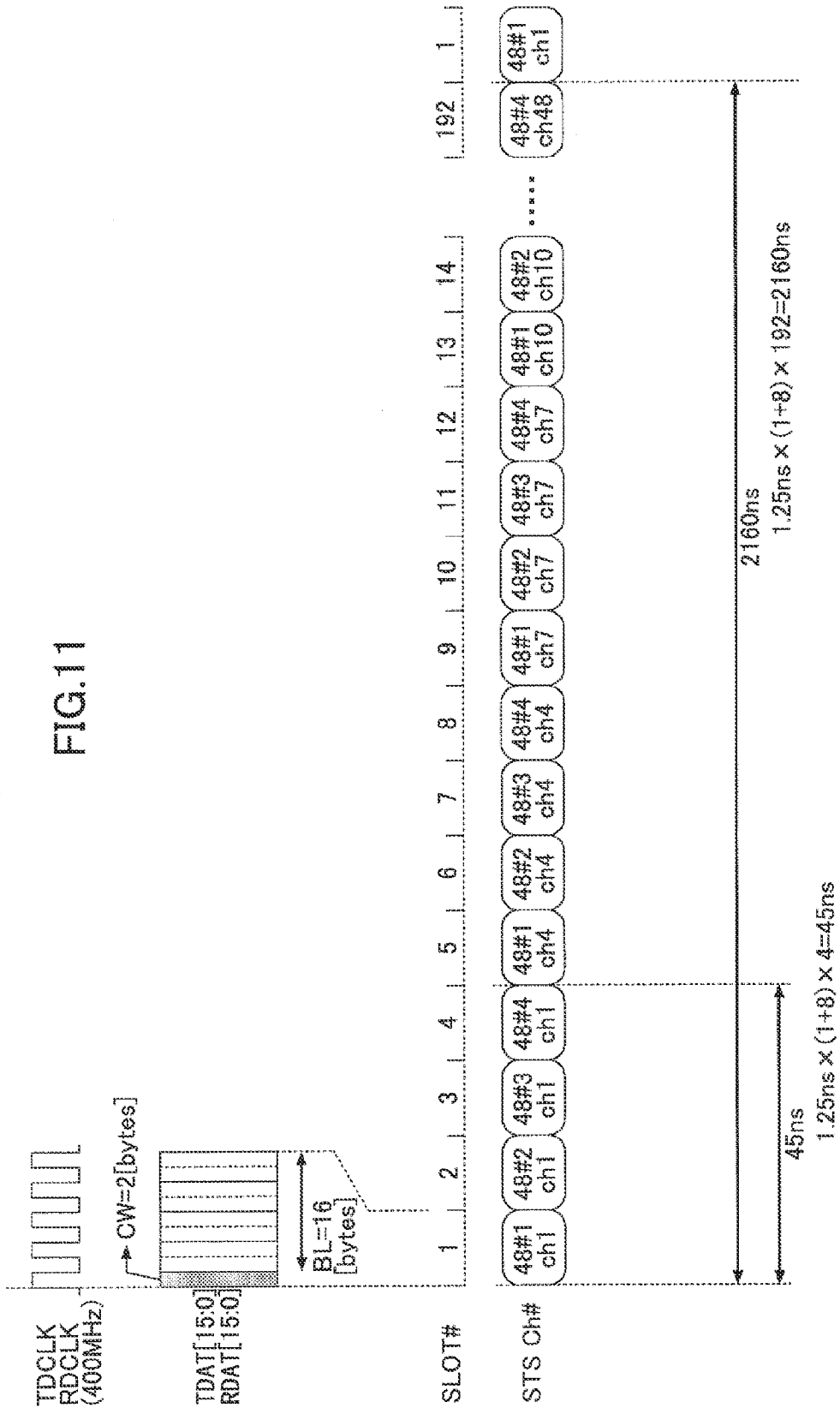
FIG. 11 depicts one example of allocation.

FIG. 11 depicts one example of allocation. In FIG. 11, TDCLK denotes a transmission data clock signal; RDCLK denotes a reception data clock signal; TDAT denotes transmission data; and RDAT denotes reception data. A control word of 2 bytes is added to a data transfer slot of BL=16 bytes, and thus a total of 18 bytes is the fixed length and the minimum unit of a data stream of SPI4.2; and thus, time slots for OC-192 are defined. Specifically, the slot numbers, 1 through 192, are allocated, and the allocation is repeated while the slot numbers are circulated. For the time slots, STS channel numbers are uniquely determined according to TDM.

In FIG. 11, OC-48×4=OC-192 is provided. That is, a time slot of slot#1 is allocated to STS-48#1, channel 1 (ch1) (50 Mbps), a time slot of slot#2 is allocated to STS-48#2, channel 1, a time slot of slot#3 is allocated to STS-48#3, channel 1, and a time slot of slot#4 is allocated to STS-48#4, channel 1. In this case, for example, in the control word of the time slot of slot#1, channel identification information that indicates STS-48#1, channel 1, is set.

Thus, in the SPI4.2 interface 33d, transmission in the fixed length can be achieved as a result of the minimum burst being thus set. Then, segment dividing that changes data transmission in packet units into data transmission in TDM units is carried out by the TDM scheduler 33c, as will be described below.

Figure 12:
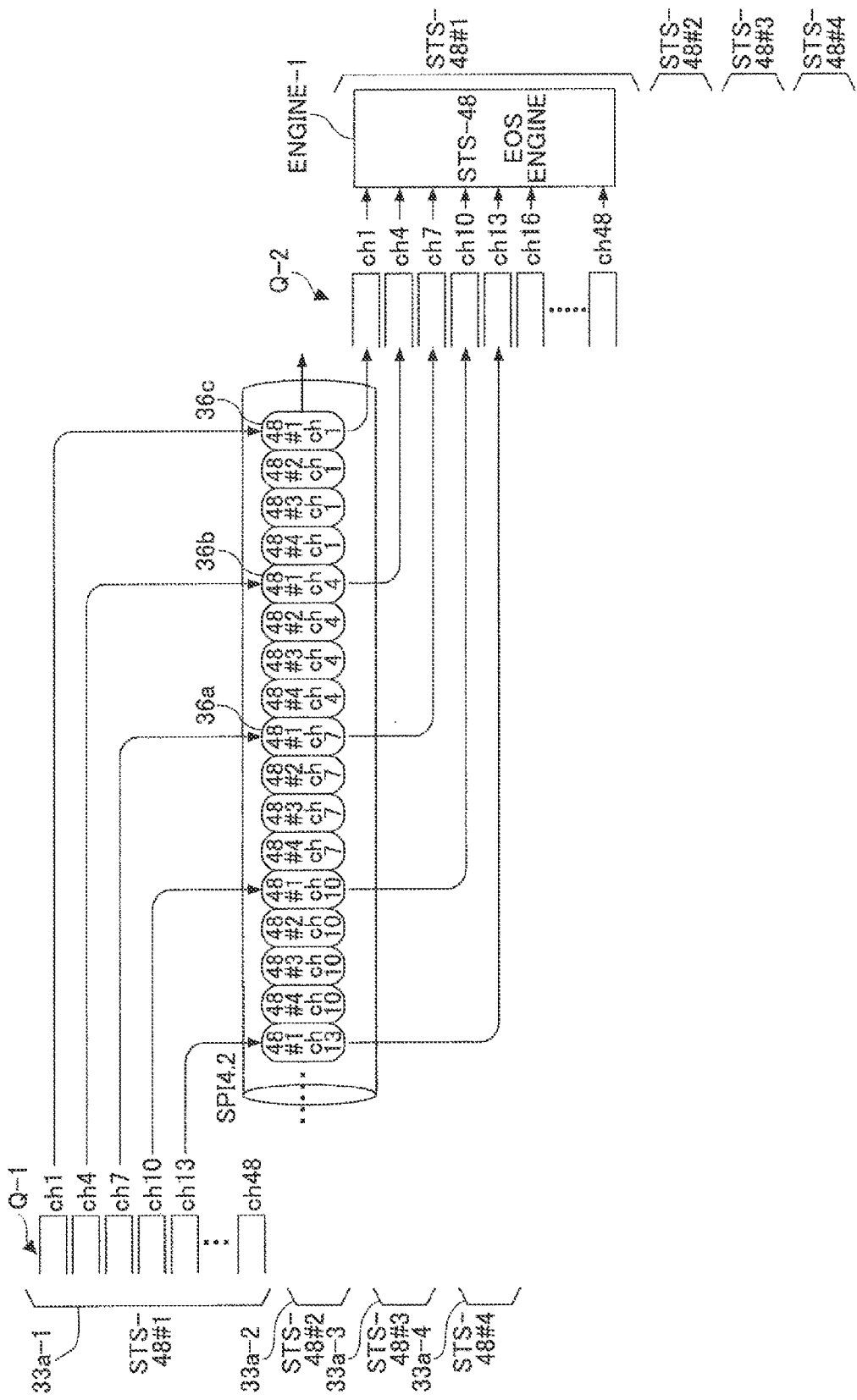
FIG. 12 illustrates operations of a TDM scheduler according to the example depicted in FIG. 11.

FIG. 12 illustrates operations of the TDM scheduler 33c in the example depicted in FIG. 11. In FIG. 12, in a case where the priority scheduler 33a-1 outputs for STS-48#1, channel 1 (ch1), data of 16 bytes is read from an output queue (Q-1) of a channel 1 (ch1), which is included in the priority scheduler 33a-1 for STS-48#1, and is output to the time slot that is allocated to STS-48#1, channel 1 (ch1). The time slot is allocated periodically according to SPI4.2 as depicted in FIG. 11. The subsequent time slot of SPI4.2 is allocated to STS-48#2, channel 1 (ch1). Therefore, similarly, from a queue of a channel 1 (ch1) included in the priority scheduler 33a-2 for STS-48#2, data of 16 bytes is read, and is output to the time slot for STS-48#2, channel 1 (ch1). Naturally, in a case where no data exists in the priority schedulers to output to the time slot, no data is read, and a process "IDLE" according to SPI4.2 is carried out. The control word (CW) of 2 bytes, attached to the data of 16 bytes, includes "ADR" (see FIG. 13), which is used to transmit the channel identification information.

As depicted in FIG. 12, each of the priority schedulers includes the queues Q-1, from which the data of 16 bytes is read as mentioned above, to be output to the corresponding time slot of the data stream of SPI4.2. Up to the queues Q-1, the data is processed in packet units. When the data is read from the queue Q-1 to be output to the corresponding time slot of the data stream of SPI4.2, the data is processed in byte (TDM) units. The data of 16 bytes is referred to as a segment. Thus, the TDM scheduler 33c carries out segment dividing to change data transmission in packet units into data transmission in TDM units.

Further, in FIG. 12, the data stream of SPI4.2 is transmitted from the QoS engine 33 to the SONET frame mapper 34 that includes input queues Q-2 and a STS-48 EOS engine ENGINE-1. The TDM scheduler 34b of the SONET frame mapper 34 takes the data of 16 bytes from the corresponding time slot of the data stream of SPI4.2 received from the QoS engine 33, and stores the taken data of 16 bytes in the corresponding input queue Q-2. The input queues Q-2 correspond to the time slots of the SPI4.2 transmission path, respectively. The input queues Q-2 correspond to the queues 34c-1 through 34c-m depicted in FIG. 10, respectively. The STS-48 EOS engine ENGINE-1 reads the data from the input queues Q-2 in byte units, and carries out SONET mapping of the read data according to the ITU-T (International Telecomm Union-Telecommunication standardization sector) recommendations.

FIG. 13 depicts a format of the control word (CW). TYPE of 1 bit indicates a control word type. Next, EOPS (End Of Packet State) of 2 bits and SOP (Start Of Packet) exists. Next ADR (port address) of 8 bits indicates the channel identification information as mentioned above. Finally, DIP4 (4 bit Digital Interleaved Parity) of 4 bits exists.

It is noted that, the control word at a time of IDLE process of SPI4.2 is set as: TYPE='0', EOPS='00', SOP='0', and ADR=all '0'.

In the related art, as depicted in FIG. 6, a changing point from data transmission in packet units to data transmission in TDM units is in the SONET frame mapper 24. In contrast, according to the embodiment as depicted in FIG. 10, a changing point from data transmission in packet units to data transmission in TDM units is moved to the QoS engine 33. Further, by transmitting the channel identification information through the TDM schedulers 33c and 34b, the time axis of TDM can be set in the SPI4.2 transmission part between the QoS engine 33 and the SONET frame mapper 34.

As a result, the storage capacity of each of the queues 34c-1 through 34c-m of the SONET frame mapper 34 can be reduced to be on the order of the storage capacity of 1 row in the SONET frame. Thus, it is possible to reduce the buffer sizes of the buffers included in the SONET frame mapper 34.

It is noted that since the control word of 2 bytes of the SPI4.2 transmission is added to the segment division of 16-byte units as mentioned above, bandwidth loss may increase. Therefore, below, from the bandwidth view point, it is proved that 10 Gbps transmission is available in the embodiment.

For example, SPI4.2 provides the bandwidth of 800 Mbps (400 M DDR (Double Data Rate)), and mapping is carried out in STS-192 of SONET having the bandwidth of 10 Gbps. Assuming that the burst length of SPI4.2 is the minimum 16 bytes of SPI4.2 transmission, a time for transmitting 192 channels×18 bytes (16 bytes of the effective data and 2 bytes of the control word) is obtained as follows:

$$9 \times 192 \times (1/800 \text{ [Mbps]}) = 1725 \times 1.25 \text{ [ns]} = 2160 \text{ [ns]}$$

It is noted that since SPI4.2 provides a data path of a width of 16 bits, the SPI4.2 transmission path transmits 16 bits during a time period of transmitting 1 bit. Then, when the above-mentioned 18 bytes is divided by the 16 bits, i.e., 2 bytes, 9 is obtained. Thus, the SPI4.2 transmission path transmits the 18 bytes during a time period of transmitting 9 bits. Therefore, the SPI4.2 transmission path transmits the above-mentioned 192 channels×18 bytes, during a time of transmitting 9 bits×192=1728 bits. On the other hand, the time period of transmitting 1 bit is 1/800 Mbps=1.25 ns. Therefore, as depicted in the above-mentioned formula, the SPI4.2 transmission path transmits the 192 channels×18 bytes during the time period of 1728 bits×1.25 ns=2160 ns. On the other hand, the amount of the effective data thus transmitted during the time period of 2160 ns is as follows:

$$16 \text{ [bytes]} \times 192 \text{ [segments]} = 3072 \text{ [bytes]}$$

Next, the time period of transmitting 1 row in the STS-192 frame of SONET will be obtained. First, a time period of transmitting 1 bit according to 10 Gbps transmission is obtained as follows:

$$1/9.95328 \text{ [Gbps]} = 0.1004693 \text{ [ns]}$$

1 row in the STS-192 frame of SONET has the following capacity in bytes:

$$90 \text{ [bytes]} \times 192 \text{ [channels]} = 17280 \text{ [bytes]}$$

Therefore, the time period of transmitting 1 row in the STS-192 frame of SONET is obtained as follows:

$$0.1004693 \text{ [ns]} \times 17280 \text{ [bytes]} \times 8 \text{ [bits]} = 13889 \text{ [ns]} \quad (1A)$$

During the time period of 13889 ns, the above-mentioned capacity 17280 bytes of 1 row in the STS-192 frame of SONET will be filled with the data transmitted through the SPI4.2 transmission path that transmits 3072 bytes during the time period of 2160 ns as mentioned above. For this purpose, the SPI4.2 transmission path repeats the transmission of the 3072 bytes. The number of times of the repetitions in order to fill the above-mentioned capacity 17280 bytes of 1 row in the STS-192 frame of SONET is obtained as follows:

$$17280 \text{ [bytes]}/3072 \text{ [bytes]} = 5.625 \text{ [times]}.$$

During the repetitions of the transmission of 3072 bytes by the 5.635 times, the following time period elapses:

$$2160 \text{ [ns]} \times 5.635 \text{ [times]} = 12150 \text{ [ns]} \quad (1B)$$

This time period of 12150 ns is shorter than the above-mentioned time 13889 ns of transmitting 1 row in the STS-192 frame of SONET obtained by the above-mentioned formula (1A). Therefore, the extra bandwidth can be obtained based on the difference (extra time) between 13889 ns and 12150 ns. Further, the bandwidth for transmitting the overhead will be considered in addition to the bandwidth for transmitting the payload of the STS-192 frame of SONET, and the above-mentioned extra bandwidth can cover the bandwidth for transmitting the overhead. Accordingly, the above-mentioned bandwidth of 800 Gbps of the SPI4.2 path is sufficient to fill 1 row in the STS-192 frame of SONET. It is noted that the extra bandwidth can also cover the training period prescribed in the SPI4.2 standard.

<Virtual Concatenation>

Further, as mentioned above, the time slots of SPI4.2 transmission path depicted in FIG. 11 are defined in STS channel units. Therefore, virtual concatenation can also be easily realized as a result of defining corresponding ones of the STS channels at a time of virtual concatenation. That is, virtual concatenation information is managed in a form of a comparison table (bandwidth setting table) that is provided on both of the transmission side and the reception side.

Figure 14:
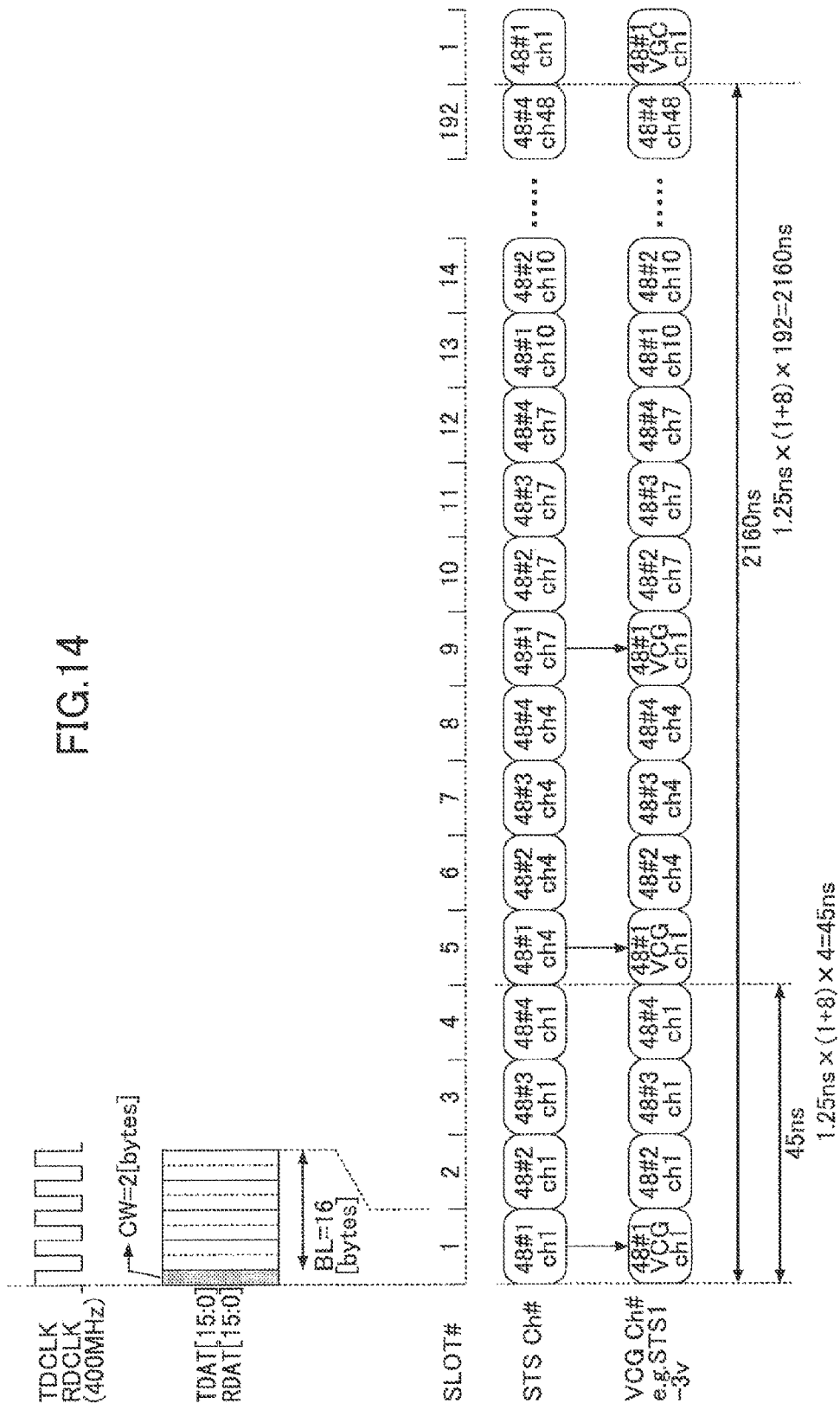
FIG. 14 depicts one example of virtual concatenation allocation.
Figure 15:
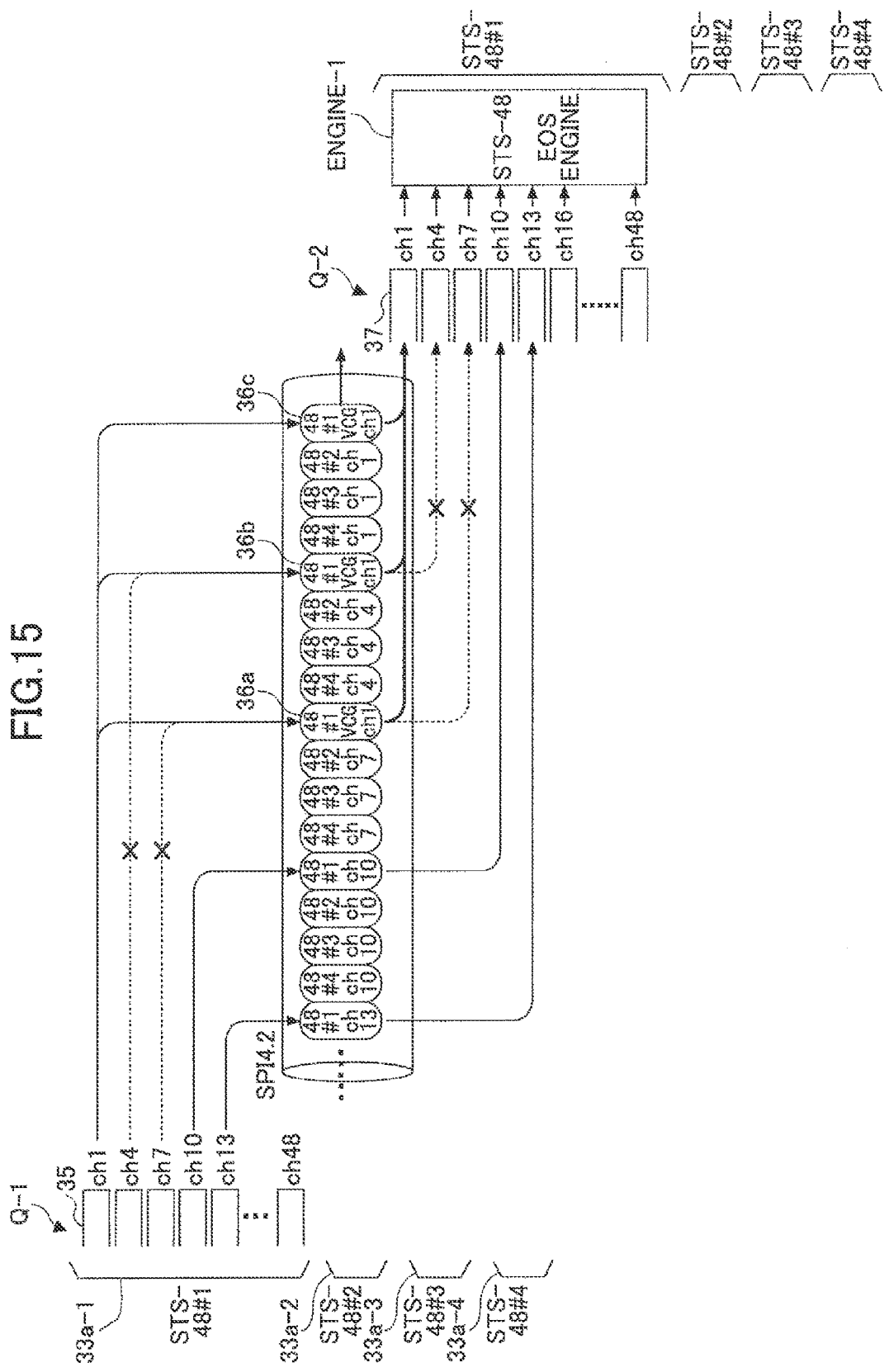
FIG. 15 illustrates operations of a TDM scheduler in the example depicted in FIG. 14.

FIG. 14 depicts an example of allocation in which STS-48#1, channels 1, 4 and 7, are defined for virtual concatenation (VCAT), and STS1-3v bandwidth (150 Mbps) is obtained. Further, FIG. 15 illustrates operations of the TDM scheduler 33c for the example of FIG. 14.

In this case, the QoS engine 33 manages typical channels VCG channel 1 (ch1) that are regarded as a group, i.e., VCG. The data of three channels of the VCG is read, in 16-byte units, from the output queue 35 (Q-1) allocated to the VCG channel 1 (ch1), and the read channel data is allocated to the time slots 36a, 36b and 36c, respectively, during one circulation of the time slot numbers of 1 through 192 (see FIG. 15). The data of these time slots 36a, 36b and 36c is then taken on the reception side, i.e., the SONET frame mapper 34, and is stored in the input queue 37 (Q-2) of the SONET frame mapper 34. The input queue 37 (Q-2) is one that is allocated to the VCG channel 1 (ch1). In this case, for example, in the control words included in the data of the time slots 36a, 36b and 37c, the identification information that indicates the VCG channel 1 (ch1) is set.

Thereby, the data of VCG channel 1 (ch1) is transmitted in a state in which the bandwidth of STS-1 is tripled. Also, the data is transmitted, not in a burst manner, but in the manner the same as the manner in which the data of the other time slots of SONET channels are transmitted. Therefore, also in the case where the virtual concatenation is thus executed, i.e., the output bandwidth is widened or narrowed, the buffer sizes that the SONET frame mapper 34 has do not change.

<System Handling High Order Channels and Low Order Channels>

In the above description, the SPI4.2 transmission path is allocated to the bandwidth of SONET considering the time slots of SONET, and the allocation is carried out for the high order channels (high rate, for example, 50 Mbps). A specific channel of the high order channels may be allocated to low order channels (low rate, for example, 1.5 Mbps). Thereby, it is possible to realize a system that handles both the high order channels and the low order channels.

Figure 16:
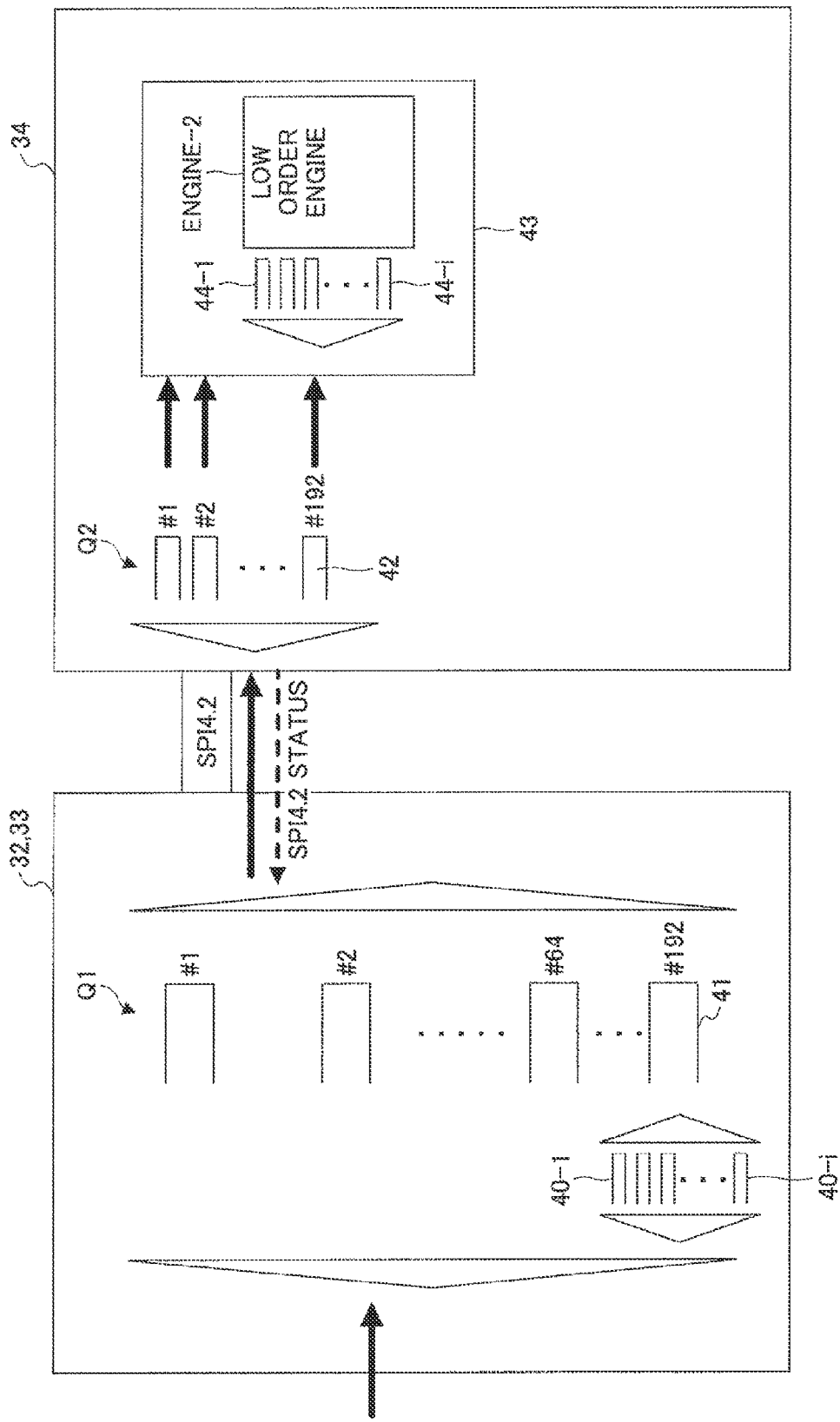
FIG. 16 depicts a system in which both high-order channels and low-order channels are included.

As diagrammatically depicted in FIG. 16, in the network processor 32, queues 40-1 through 40-$i$ for the low order channels are provided, packets respectively stored in the queues 40-1 through 40-$i$ are read in 16-byte units (LO data), are multiplexed in a TDM manner, and then are stored in, for example, the output queue 41 (Q-1) of the QoS engine 33. It is noted that in FIG. 16, the network processor 32 and the QoS engine 33 are depicted as being included in a single block for the sake of convenience. The output queue 41 (Q-1) is one allocated to the high order channel of VCG#192, for example. It is noted that, for thus multiplexing the LO data that is read in 16-byte units as mentioned above, destination channel data (for example, DS1ch1, or such) is embedded in the LO data in 16-byte units. It is noted that, as depicted in FIG. 16, the output queues Q-1 further include those for the respective ones of the high order channels VCG#1 through VCG#191.

As a result, from the output queue 41 (Q-1), the LO data read from the queue 40-1 is read by 16 bytes at the timing of VCG#192 during the first circulation, the LO data read from the queue 40-2 is read by 16 bytes at the timing of VCG#192 during the second circulation, . . . , and the LO data read from the queue 40-$i$ is read by 16 bytes at the timing of VCG#192 during the i-th circulation. The thus-read LO data is then allocated to the time slots of VCG#192, respectively. In this case, in the control words allocated to the time slots of VCG#192, the channel identification information that indicates VCG#192 is set.

Then, in the SONET frame mapper 34, the data thus allocated to the time slots that have the channel identification information of VCG#192 are taken from the time slots and stored in the input queue 42 (Q-2) (corresponding to the queue 34$c$-$m$ depicted in FIG. 10). Then, a SONET frame scheduler 43 provided in the SONET frame mapper 34 reads the data from the input queue 42 in 16-byte units, and based on the destination channel data embedded in the corresponding time slots, stores the data in queues 44-1 through 44-$i$ for the low order channels, respectively, in sequence. A low order engine ENGINE-2 then reads the data from the queues 44-1 through 44-$i$ in byte units, and carries out SONET mapping of the read data according to the ITU-T (International Telecomm Union-Telecommunication standardization sector) recommendations. Further, it is noted that, as depicted in FIG. 16, the input queues Q-2 further include those for the respective ones of the high order channels VCG#1 through VCG#191 (corresponding to the queues 34$c$-1 . . . , depicted in FIG. 10, respectively).

Thereby, it is possible to allocate the time slots of the SPI4.2 transmission path to the plural low order channels according to the same time slot definition as that of the high order channels.

<Configuration of QoS Engine and SONET Frame Mapper>

Figure 17:
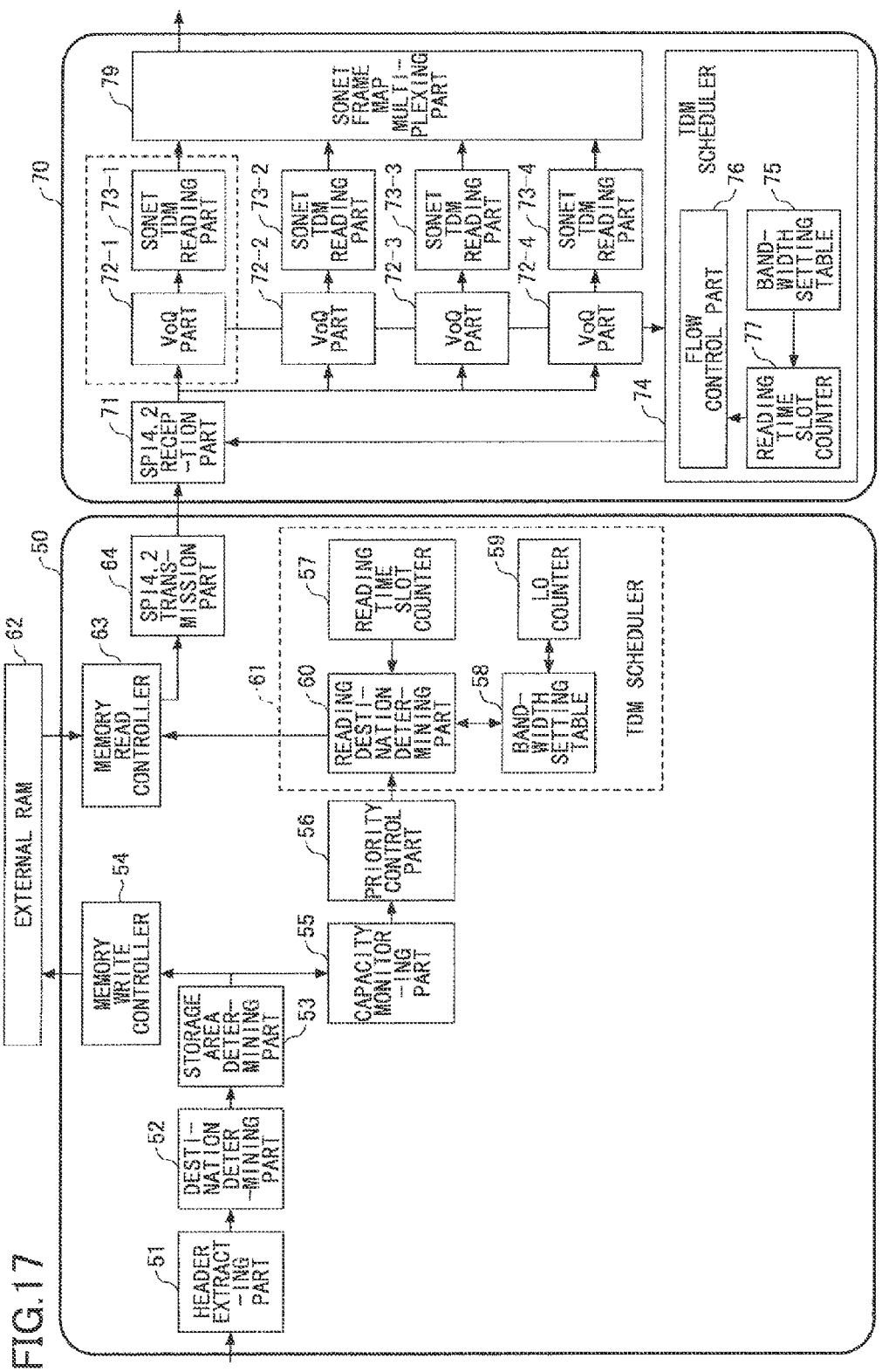
FIG. 17 depicts a configuration of another embodiment of a QoS engine and a SONET frame mapper.

FIG. 17 depicts a configuration of a QoS engine and a SONET frame mapper in another embodiment. In FIG. 17, LAN frames are input to the QoS engine 50 from a network processor in a preceding stage (not depicted), and are input to a header extracting part 51. The header extracting part 51 extracts header information from the LAN frames to determine respective destinations of the LAN frames.

A destination determining part 52 determines, for each LAN frame, a destination channel to which the LAN frame is to be output, based on the thus-extracted header information.

A storage area determining part 53 determines, for the LAN frames for which the destinations have been determined, respective storage areas to which the LAN frames are to be buffered for the destinations.

A memory write controller 54 carries out write control to store in an external RAM 62 the LAN frames for which the storage areas have been determined.

A capacity monitoring part 55 counts the number or volume of the LAN frames that are thus stored in the external RAM 62, and reduces the counted number or volume of the LAN frames that are read from the external RAM 62. It is possible to determine whether any frames that are to be output in destinations units exist, by reading the count number or volume of the capacity monitoring part 55.

A priority control part 56 selects a LAN frame to be read with priority from among the LAN frames having the same destination stored in the external RAM 62, for the purpose of carrying out control for a frame to which priority is given, or control for contracted bandwidths, to carry out QoS control.

A reading time slot counter 57 is a free running 192-ary counter that cyclically increments the number between 1 through 192 to define time slots 1 through 192, one by one in sequence, for inter-chip transmission path.

A bandwidth setting table 58 includes a correspondence table for respective correspondences between the time slot numbers and destination path numbers. In a case of VCAT, it is possible to carry out bandwidth control at the SONET level by setting the same destination for plural time slot numbers in the bandwidth setting table 58. It is also possible to set NOP (No OPeration) in the bandwidth setting table 58. Further, not only the high order channels, but also the low order channels may be set in a mixed manner. In a case where the low order channels are set in the bandwidth setting table 58, a LO counter 59 (described later with reference to FIG. 19) is used.

In respective EOS apparatuses connected at both ends of SONET (in the example of FIG. 3A, the respective EOS apparatuses 11 and 12), respective bandwidth setting tables 58 (and 75, described later) have the same configurations between the respective EOS apparatuses. It is possible to dynamically change the configurations of the respective bandwidth setting tables 58 so that the respective bandwidth setting tables 58 have the same configurations, by using a LCAS (Link Capacity Adjustment Scheme) protocol that increases or decreases bandwidths of paths that are virtually concatenated, or such.

Therefore, even in a case where a dynamic bandwidth change occurs in the SONET channels by using the LCAS protocol of SONET or such, the bandwidth setting tables may be dynamically changed, and thus the transmission path bandwidths may be dynamically controlled.

Address information of (the frame of) the LAN packet which is selected by the priority control part 56 to be read with priority is input by the priority control part 56 to a reading destination determining part 60 in a respective destination unit. When data reading is carried out, the reading destination determining part 60 obtains the time slot number from the reading time slot counter 57, obtains the destination corresponding to the obtained time slot number from the bandwidth setting table 58, and outputs an instruction to read the data for the obtained destination to a memory read controller 63. The reading time slot counter 57, the bandwidth setting table 58, the LO counter 59 and the reading destination determining part 60 are included in a TDM scheduler 61.

The memory read controller 63 accesses the external RAM 62, reads the data for the destination, and outputs the data.

A SPI4.2 transmission part 64 carries out a SPI4.2 interface source process, i.e., a process of adding a destination channel number identifier and so forth to the data, and carrying out a transmission process in inter-chip transmission according to the SPI4.2 standard. At this time, the burst length is defined as 16 bytes that is the minimum one according to the SPI4.2 standard.

<Configuration of SONET Frame Mapper>

The transmission signal sent from the SPI4.2 transmission part 64 is input to a SONET frame mapper 70, and is supplied to a SPI4.2 reception part 71. The SPI4.2 reception part 71 carries out a SPI4.2 interface synchronization process, i.e., a reception process in inter-chip transmission according to the SPI4.2 standard, and supplies the received data of the time slot to one of four VoQ (Virtual Output Queue) parts 72-1 through 72-4, which corresponds to the channel identified by the channel identification information included in the control word set in the received time slot.

The VoQ parts 72-1 through 72-4 include logical queues having small capacities provided in destination channel units (for every output route), and, for example, include respective 192 logical queues corresponding to VCG#1 through VCG#192, where the 192 logical queues are equally divided among the four VoQ parts 72-1 through 72-4. It is noted that, in a case where the VCG#192 logical queue of the VoQ part 72-4 is allocated to the i low order channels that are multiplexed, respective logical queues for the i low order channels are further provided in the VoQ part 72-4.

The data of the received time slots are supplied to the VoQ parts 72-1 through 72-4, and are stored in the logical queues respectively corresponding to the destination channels indicated by the channel identification information set in the time slots. At the time of storing the data of the time slots, the control words are deleted, and only the effective data is stored in the logical queues.

Respective ones of SONET TDM reading parts 73-1 through 73-4 read the data from the logical queues of the VoQ parts 72-1 through 72-4 in byte units according to the channels defined in the payload of the SONET frame, and carry out SONET mapping according to the ITU-T recommendations. It is noted that the VoQ part 72-1 and the SONET TDM reading part 73-1 are included in a first STS-48 EOS engine (corresponding to the above-mentioned STS-48 EOS engine ENGINE-1 depicted in FIGS. 12, 15 and 16), the VoQ part 72-2 and the SONET TDM reading part 73-2 are included in a second STS-48 EOS engine, the VoQ part 72-3 and the SONET TDM reading part 73-3 are included in a third STS-48 EOS engine, and the VoQ part 72-4 and the SONET TDM reading part 73-4 are included in a fourth STS-48 EOS engine. Each one of the four STS-48 EOS engines outputs a signal of STS-48 (2.4 Gbps).

In the case where the VoQ parts 72-1 through 72-4 have the 192 logical queues respectively corresponding to VCG#1 through VCG#192 as mentioned above, when any of the 192 logical queues becomes full and congestion occurs, the VoQ parts 72-1 through 72-4 supply the VCG number of the congested logical queue to a TDM scheduler 74.

The TDM scheduler 74 searches a bandwidth setting table 75 that the TDM scheduler 74 includes for the supplied VCG number of the congested logical queue and obtains the corresponding time slot number from the bandwidth setting table 75. The TDM scheduler 74 further includes a flow control part 76 that stores statuses (each "congested" or "not yet congested") for the respective time slot numbers 1 through 192. The TDM scheduler 74 sets the status of the obtained time slot number in the flow control part 76 as "congested". The TDM scheduler 74 sets the status of the time slot number in the flow control part 76 as "not yet congested", for which the TDM scheduler has not received the VCG number of the congested logical queue.

The TDM scheduler 74 further includes a reading time slot counter 77 that is a free running 192-ary counter that cyclically increments the number between 1 through 192, one by one, in sequence. The reading time slot counter 77 supplies the count value to the flow control part 76. The flow control part 76 reads the respective statuses (each "congested" or "not yet congested") of the time slot numbers 1 through 192, in sequence, based on the supplied count values, and supplies the read statuses to the SPI4.2 reception part 71. The SPI4.2 reception part 71 transmits the supplied congestion information, i.e., the statuses (each "congested" or "not yet congested") of the respective time slot numbers 1 through 192, to the SPI4.2 transmission part 64. According to the supplied congestion information, the SPI4.2 transmission part 64 carries out back pressure control, for example, to stop data stream transmission for the time slot number, the status of which is "congested", for a predetermined time interval.

A SONET frame map multiplexing part 79 carries out a multiplexing process of the four lines of signals each of STS-48 (2.4 Gbps) output from the four SONET TDM reading parts 73-1 through 73-4, and outputs a signal of STS-192 (10 Gbps).

<Bandwidth Setting Table>

FIG. 18 shows one example of the bandwidth setting tables 58 and 75 depicted in FIG. 17. In this example, virtual concatenation is set. In this example, each of the bandwidth setting tables 58 and 75 has a correspondence table TB1 indicating respective correspondences between the time slot numbers and the destination path numbers.

That is, the destination path number STS-48#1, VCG channel 1 (ch1), is associated with the time slot numbers 1, 5 and 9. It is noted that, the destination path number STS-48#2, channel (ch1) is associated with the time slot number 2, and the destination path number STS-48#3, channel (ch1) is associated with the time slot number 3. The example of FIG. 18 corresponds to the above-mentioned example of FIGS. 14 and 15 concerning the allocation of the time slots.

Figure 19:
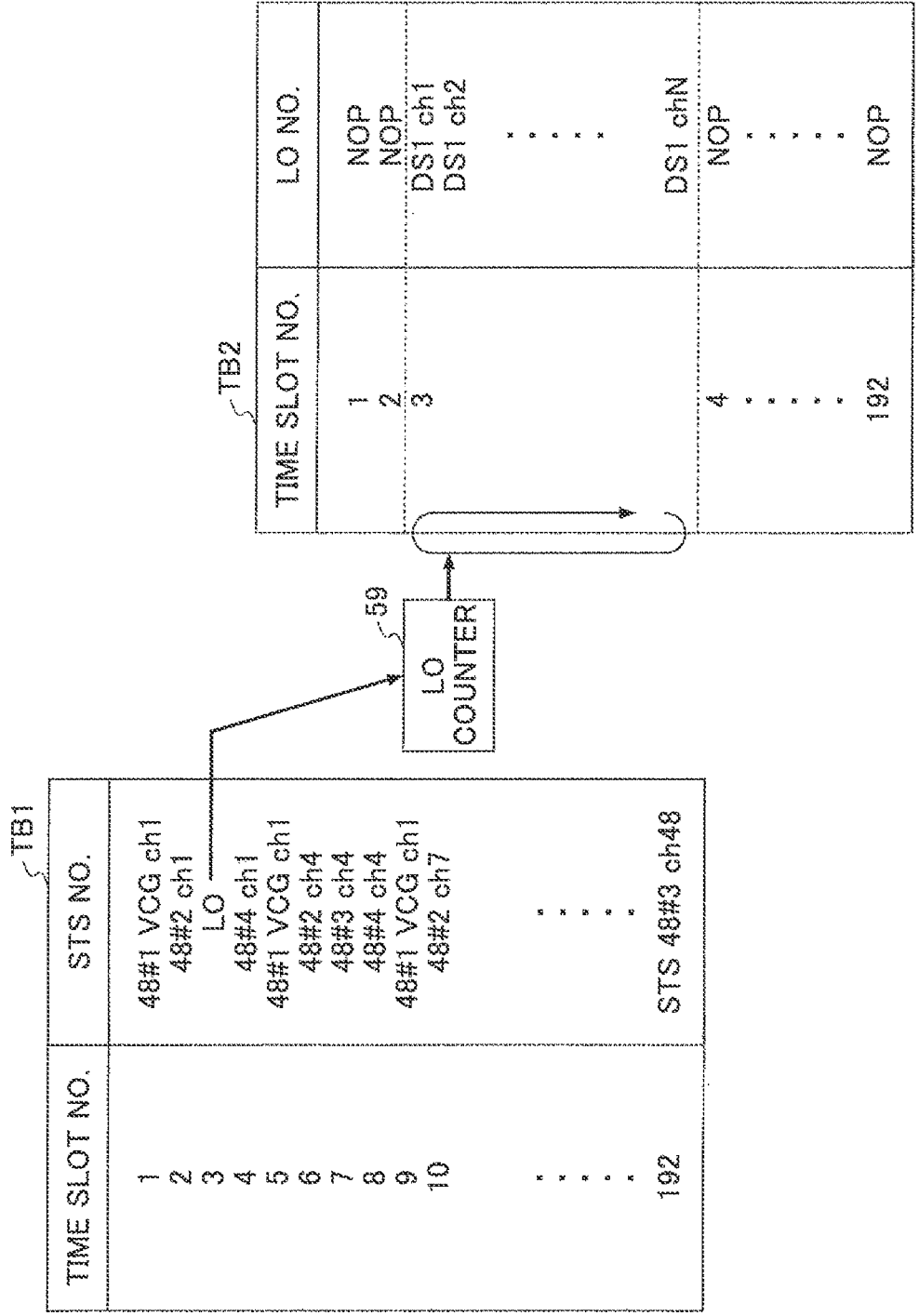
FIG. 19 depicts a second example of a bandwidth setting table.

FIG. 19 depicts a second example of the bandwidth setting tables 58 and 75. In this example, the high order channels and the low order channels are handled in the mixed manner. In this case, each of the bandwidth setting tables 58 and 75 has a correspondence table TB1 indicating respective correspondences between the time slot numbers and the destination path numbers. Further, the bandwidth setting table 58 has a LO schedule table TB2 prescribing respective correspondences between the time slot numbers and the LO count values, and the LO path numbers.

That is, in the correspondence table TB1 of FIG. 19, the time slot number 3 is associated with the low order channels (LO). The LO counter 59 depicted in FIG. 17 searches the destination path numbers of the correspondence table TB1 for the low order channels (LO), and increments the count value each time when the low order channels (LO) are found out from the destination path numbers of the correspondence table TB1 (i.e., each time when "3" of the time slot number occurs in the correspondence table TB1).

In the LO schedule table TB2 of FIG. 19, "3" of the time slot number, and also, "1" of the count value of the LO counter 59, are associated with the low order channel DS1, channel 1 (ch1); "3" of the time slot number, and also, "2" of the count value of the LO counter 59, are associated with the low order channel DS1, channel 2 (ch2); . . . ; "3" of the time slot number, and also, "N" of the count value of the LO counter 59, are associated with the low order channel DS1, channel N (chN).

Thus, according to the embodiments described above, the packets are divided into segments each having a fixed length, and the divided segments are multiplexed in the TDM manner, are transmitted according to SPI4.2. Therefore, it is possible to avoid an occurrence of the above-mentioned "head of line blocking" caused by the packets that depend on the respective frame lengths. Further, the plural queues that store the packets are provided in the SONET channel (VCG) units. Thereby, it is possible to change sequential frame-by-frame transmission into parallel transmission in destination units.

Further, the SPI4.2 transmission path is previously allocated in the TDM manner to the bandwidths that correspond to the SONET time slots. Thereby, it is possible to bring the SONET TDM scheduling to SPI4.2, it is possible to reduce the capacities of the VCG queues provided in the SONET frame mapper, and also, it is possible to avoid underrun (buffer underrun) of the VCG queues. Further, the time slots of the SPI4.2 transmission path are allocated in the SONET STS channel units, and also, at a time of virtual concatenation, the corresponding part of the STS channels is allocated the time slots of the SPI4.2 transmission path. Therefore, it is possible to easily apply the virtual concatenation.

Further, the specific queue of the plural queues that store the packets is allocated to the plural SONET low order channels. Thereby, it is possible to easily handle the high order channels and the low order channels in the mixed manner.

It is noted that, in the above-mentioned embodiments, SPI4.2 (up to 10 Gbps) is used as the interfaces between the devices (inter-device interfaces). However, embodiments are not limited to the above-mentioned embodiments, and another inter-device interface may be used instead in a transmission system that supports a wider bandwidth, which interface can transmit a control signal that indicates a channel identifier, start/stop of the packet and so forth, and a data stream, for example, Interlaken or such.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment(s) of the present inventions have been described in detail, it should be understood that various changes, substitutions, and alterations could be made hereto without departing from the sprit and scope of the invention.

What is claimed is:

1. A transmission apparatus comprising:
    an engine configured to receive data in units of packets having a variable length and transmit a data stream signal via a SPI4.2 (System Packet Interface level 4, Phase 2) standard interface; and
    a mapper configured to receive the data stream signal via the SPI4.2 standard interface and transmit data in units of TDM (Time Division Multiplexing) to a SONET (Synchronous Optical Network),
    wherein the engine segments each of the plurality of packets into a plurality of segments having a fixed length and multiplexes the plurality of segments into the data stream signal together with channel identification information identifying channels of the SONET,
    wherein the engine includes
        a priority scheduler configured to store the plurality of packets and perform a priority process to output the plurality of packets in an order according to priority;
        a shaper configured to process the plurality of packets to match output bandwidths; and
        a TDM scheduler configured to multiplex outputs of the shaper,
    wherein the mapper maps the data stream signal in frames of the SONET based on the channel identification information, and
    wherein the TDM scheduler includes
        a counter configured to cyclically count a time slot;
        a first table configured to store time slot numbers of the SONET and destination path numbers in correspondence with each other; and
        a destination determining unit configured to determine a destination path number of the plurality of packets output from the priority scheduler by referring to the first table based on the time slot counted by the counter.

2. The transmission apparatus as claimed in claim 1, further comprising:
    a storage coupled to the engine and configured to provide queues that store frames of the plurality of packets,
    wherein the queues are provided in units of the channels of the SONET identified by the channel identification information.

3. The transmission apparatus as claimed in claim 2, wherein the engine allocates in advance the data stream signal in a time division manner to bandwidths that correspond to time slots of the SONET based on the channel identification information.

4. The transmission apparatus as claimed in claim 3, wherein the engine allocates time slots of the data stream signal in units of the channels of the SONET.

5. The transmission apparatus as claimed in claim 4, wherein
    the queues are allocated to high-speed channels of the SONET, and
    one of the queues is allocated to low-speed channels of the SONET.

6. The signal transmission apparatus as claimed in claim 1, wherein the engine includes
    a first SPI4.2 standard interface configured to transmit a multiplexed output of the TDM scheduler as the data stream signal together with the channel identification information,
    and wherein the mapper includes a second SPI4.2 standard interface configured to receive from the first SPI4.2 standard interface the data stream signal together with the channel identification information.

7. The signal transmission apparatus as claimed in claim 6, further comprising:
    a storage coupled to the TDM scheduler and configured to provide queues that store the frames of the plurality of packets when the priority scheduler performs the priority process.

8. The signal transmission apparatus as claimed in claim 1, wherein contents of the first table are dynamically changeable depending on a dynamic change in bandwidths of the channels of the SONET.

9. The signal transmission apparatus as claimed in claim 8, wherein the mapper includes a second table identical to the first table.

10. A signal transmission method for a transmission apparatus, comprising:
  in an engine of the transmission apparatus,
    receiving data in units of packets having a variable length by an engine;
    segmenting each of the plurality of packets into a plurality of segments having a fixed length;
    multiplexing the plurality of segments into a data stream signal together with channel identification information identifying channels of the SONET; and
    transmitting the data stream signal via a SPI4.2 (System Packet Interface level 4, Phase 2) standard interface; and
  in a mapper of the transmission apparatus,
    receiving the data stream signal via the SPI4.2 standard interface;
    mapping the data stream signal in frames of a SONET (Synchronous Optical Network); and
    transmitting data in units of TDM (Time Division Multiplexing) to the SONET based on the channel identification information,
  and further comprising:
  in a priority scheduler of the engine, storing the plurality of packets and performing a priority process to output the plurality of packets in an order according to priority;
  in a shaper of the engine, processing the plurality of packets to match output bandwidths;
  in a TDM scheduler of the engine, multiplexing outputs of the shaper;
  in a counter of the TDM scheduler, cyclically counting a time slot;
  in a first table of the TDM scheduler, storing time slot numbers of the SONET and destination path numbers in correspondence with each other; and
  in a destination determining unit of the TDM scheduler, determining a destination path number of the plurality of packets output from the priority scheduler by referring to the first table based on the time slot counted by the counter.

11. The signal transmission method as claimed in claim 10, further comprising:
  providing, by a storage, queues that store frames of the plurality of packets,
  wherein the queues are provided in units of the channels of the SONET identified by the channel identification information.

12. The signal transmission method as claimed in claim 11, further comprising:
  in the engine, allocating in advance the data stream signal in a time division manner to bandwidths that correspond to time slots of the SONET based on the channel identification information.

13. The signal transmission method as claimed in claim 12, further comprising:
  in the engine, allocating time slots of the data stream signal in units of the channels of the SONET.

14. The signal transmission method as claimed in claim 13, further comprising:
  in the engine, allocating the queues to high-speed channels of the SONET, and
  in the engine, allocating one of the queues to low-speed channels of the SONET.

15. The signal transmission method as claimed in claim 10, further comprising:
  in a first SPI4.2 standard interface of the engine, transmitting a multiplexed output of the TDM scheduler as the data stream signal together with the channel identification information; and
  in a second SPI4.2 standard interface of the mapper receiving from the first SPI4.2 standard interface the data stream signal together with the channel identification information.

16. The signal transmission method as claimed in claim 15, further comprising:
  in a storage coupled to the TDM scheduler, providing queues that store the frames of the plurality of packets when the priority scheduler performs the priority process.

17. The signal transmission method as claimed in claim 10, wherein contents of the first table are dynamically changeable depending on a dynamic change in bandwidths of the channels of the SONET.

18. The signal transmission method as claimed in claim 17, wherein, in the mapper of the transmission apparatus, storing, in a second table, contents identical to the contents of the first table.

* * * * *